United States Patent [19]
Sindhu et al.

[11] Patent Number: 5,195,089
[45] Date of Patent: Mar. 16, 1993

[54] APPARATUS AND METHOD FOR A SYNCHRONOUS, HIGH SPEED, PACKET-SWITCHED BUS

[75] Inventors: Pradeep S. Sindhu, Mountain View; Bjorn Liencres, Palo Alto; Jorge Cruz-Rios, Mountain View; Douglas B. Lee, San Francisco; Jung-Herng Chang, Saratoga; Jean-Marc Frailong, Palo Alto, all of Calif.

[73] Assignee: Sun Microsystems, Inc., Mountain View, Calif.

[21] Appl. No.: 636,446

[22] Filed: Dec. 31, 1990

[51] Int. Cl.$^5$ ............................................... H04J 3/02
[52] U.S. Cl. .................................. 370/85.1; 370/85.2; 370/85.6
[58] Field of Search ............... 370/85.6, 85.1, 85.2, 370/85.9, 85.13, 94.1, 94.2, 60, 61

[56] References Cited

U.S. PATENT DOCUMENTS

| 4,677,616 | 6/1987 | Franklin | 370/94.1 |
| 4,787,033 | 11/1988 | Bomba et al. | 370/85.6 |
| 4,809,269 | 2/1989 | Gulick | 370/85.2 |
| 4,933,846 | 6/1990 | Humphrey et al. | 370/85.1 |
| 5,058,110 | 10/1991 | Beach et al. | 370/85.1 |
| 5,081,622 | 1/1922 | Nassehi et al. | 370/85.6 |

FOREIGN PATENT DOCUMENTS

0309995A2  9/1988  European Pat. Off. .
0343770A2  3/1989  European Pat. Off. .

Primary Examiner—Douglas W. Olms
Assistant Examiner—Shick Hom
Attorney, Agent, or Firm—Blakely Sokoloff Taylor & Zafman

[57] ABSTRACT

A high speed, synchronous, packet-switched inter-chip bus apparatus and method for transferring data between multiple system buses and a cache controller. In the preferred embodiment, the bus connects a cache controller client within the external cache of a processor to a plurality of bus watcher clients, each of which is coupled to a separate system bus. The bus allows the cache controller to provide independent processor-side access to the cache and allows the bus watchers to handle functions related to bus-snooping. An arbiter is employed to allow the bus to be multiplexed between the bus watchers and cache controller. Flow control mechanisms are also employed to ensure that queues receiving packets or arbitration requests over the bus never overflow. A default grantee mechanism is employed to minimize the arbitration latency due to a request for the bus when the bus is idle.

15 Claims, 14 Drawing Sheets

| SECOND CYCLE | 00...0 | CONTEXT | VPN | TYPE | RSV |

*Figure 11*

| 00...0 | B | TargetID | IntSID | SetBits |

*Figure 12*

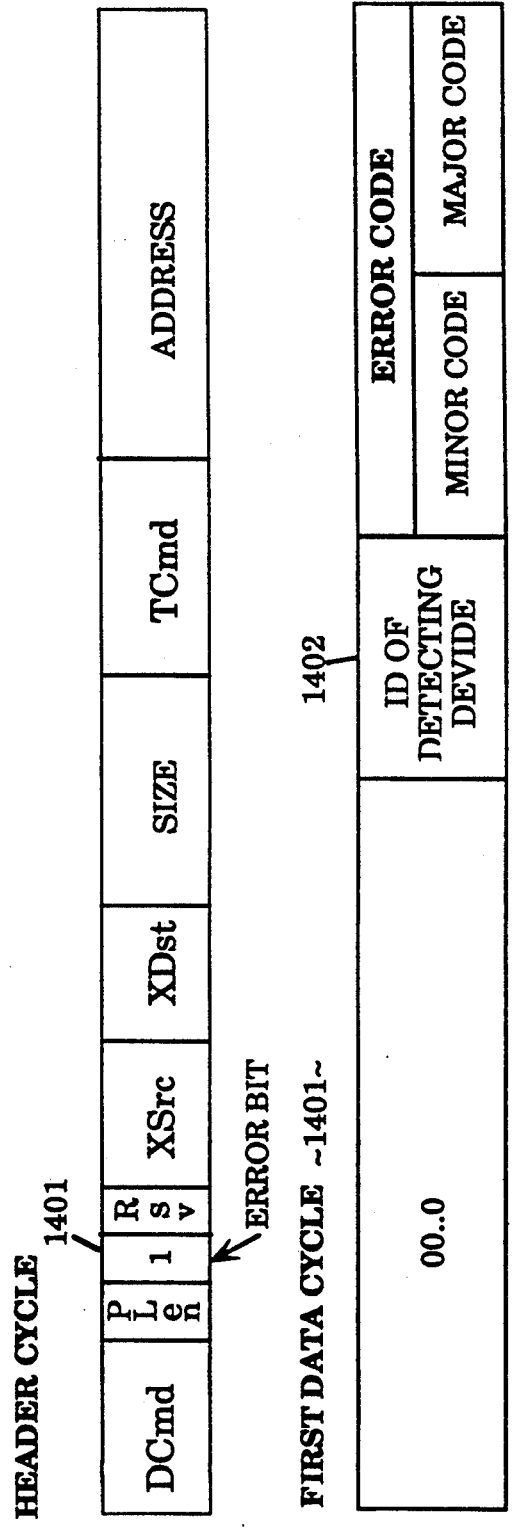

APPARATUS AND METHOD FOR A SYNCHRONOUS, HIGH SPEED, PACKET-SWITCHED BUS

BACKGROUND OF THE INVENTION

1. Field of the Invention

The present invention relates to apparatus and methods for transferring data between a source and a plurality of data processing devices. More particularly, the present invention relates to an improved bus apparatus and method for transferring data between multiple system buses and a data processing device, such as a cache controller or an I/O bus interface.

2. Art Background

In the computing industry it is quite common to transfer data and commands between a plurality of data processing devices, such as computers, printers, memories, and the like, on a system or data bus. A data processing system typically includes a processor which executes instructions that are stored in addresses in a memory. The data that is processed is transferred into and out of the system by way of input/output I/O devices, onto a bus which interconnects the data processing system with other digital hardware. Common constraints on the speed of data transfer between data processing devices coupled to a bus or protocol or "handshake" restrictions which require a pre-determined sequence of events to occur within specified time periods prior to actual exchange of data between the devices. It is therefore desirable to have a low latency and high bandwidth bus which operates quickly to minimize the computing time required for a particular task. The protocol utilized by the bus should be designed to be as efficient as possible and minimize the time required for data transfer.

Another limitation on a computer bus is the size of the bus itself. Essentially, a bus is a collection of wires connecting the various components of a computer system. In addition to address lines and data lines, the bus will typically contain clock signal lines, power lines, and other control signal lines. As a general rule, the speed of the bus can be increased simply by adding more lines to the bus. This allows the bus to carry more data at a given time. However, as the number of lines increases, so does the cost of the bus. It is therefore desirable to have a bus which operates as quickly as possible while also maintaining a bus of economical size. One such bus is disclosed in three U.S. patent applications, filed Nov. 30, 1990, by Sindhu et al, assigned to the co-Assignee of the present application, Xerox Corporation, entitled: CONSISTENT PACKET-SWITCHED MEMORY BUS FOR SHARED MEMORY MULTI-PROCESSORS, CONSISTENCY PROTOCOLS FOR SHARED MEMORY MULTI-PROCESSORS, and ARBITRATION OF PACKET-SWITCHED BUSES INCLUDING BUSES FOR SHARED MEMORY MULTI-PROCESSORS.

As will be described, the present invention provides a high speed, synchronous, packet-switched bus apparatus and method for transferring data between multiple system buses and a cache controller of a processor. In comparison with the prior art circuit-switched buses allowing only one outstanding operation, the present packet-switched bus allows multiple outstanding operations. The present invention also has an arbitration implementation that allows lower latency than other prior art packet-switched buses. As will be appreciated from the following description, the present invention permits higher performance processors and I/O devices to be utilized in a system without requiring the use of extremely high pincount packages or extremely dense VLSI technologies. In the cache controller embodiment, the present invention permits a larger dual-port cache to be built by spreading the tags over multiple chips. A larger cache results in higher hit rate and therefore better processor performance. This larger cache also has available to it a higher system bus bandwidth since it is connected to multiple system buses. Higher bandwidth also translates directly to improved processor performance. In the I/O bus interface embodiment, the present invention permits multiple high bandwidth I/O devices to be connected to multiple system buses in such a way that each I/O device has uniform access to all system buses. This provides each I/O device with a large available I/O bandwidth and therefore allows it to provide a high throughput of I/O operations.

SUMMARY OF THE INVENTION

A high speed, synchronous, packet-switched inter-chip bus apparatus and method is disclosed. In the present invention, the bus connects a cache controller client chip within the external cache of a processor to a plurality of bus watcher client chips, each of which is coupled to a separate system bus. The bus comprises a plurality of lines including multiplexed data/address path lines, parity lines, and various other command and control lines for flow control and arbitration purposes. Additionally, the bus has a plurality of point-to-point arbitration wires for each device. A variety of logical entities, referred to as "devices", can send and receive packets on the bus, each device having a unique device identification. A "chip" coupled to the bus can have multiple devices coupled to it and can use any device identification allocated to it.

The bus operates at three levels: cycles, packets, and transactions. A bus cycle is one period of the bus clock; it forms the unit of time and one-way information transfer. A packet is a contiguous sequence of cycles that constitutes the next higher unit of transfer. The first cycle of a packet, called a header, carries address and control information, while subsequent cycles carry data. In the present invention, packets come in two sizes: two cycles and nine cycles. A transaction in the third level: it consists of a pair of packets (request, reply) that together performs some logical function.

The bus allows the cache controller to provide independent processor-side access to the cache and the bus watchers to handle functions related to bus snooping. An arbiter is employed to allow the bus to be multiplexed between the bus watchers and the cache controller. Before a device can send a packet, it must get bus mastership from the arbiter. Once the device has control of the bus, it transmits the packet onto the bus one cycle at a time without interruption. The arbiter is implemented in the cache controller, and is specialized to provide low latency for cache misses and to handle flow control for packet-switched system buses. Packet transmission on the bus is point-to-point in that only the recipient identified in a packet typically takes action on the packet. These flow control mechanisms ensure that the queues receiving packets or arbitration requests over the bus never overflow. A default grantee mechanism is employed to minimize the arbitration latency due to a request for the control of the bus when the bus is idle. A mechanism is further employed to preserve the arrival order of packets on system buses as the packets arrive on the bus of the present invention.

Packet headers contain a data command, control signals, a tag command, source and destination bus identifications, and an address. The data command indicates the type of data transfer between the bus watchers and the cache controller, while the tag command is used to keep the bus-side and the processor-side copies of the cache tags consistent with one another. The data command (with the exception of the rqst/rply bit) and address in reply packets are the same as those for the corresponding request packet. These commands, along with the control signals, provide sufficient flexibility to accommodate a variety of system buses.

BRIEF DESCRIPTION OF THE DRAWINGS

FIG. 11 diagrammatically illustrates the various components comprising the second cycle for a DemapRqst command.

FIG. 12 diagrammatically illustrtes the various components comprising the second cycle for an interrupt command.

FIG. 13 diagrammatically illustrates the various components comprising the tag command within a packet header.

FIG. 14 diagrammatically illustrates the various components comprising the header cycle and first data cycle for an error reply packet.

DETAILED DESCRIPTION OF THE INVENTION

An improved high speed, synchronous, packet-switched inter-chip bus apparatus and method is described having particualar application for use in high bandwidth and low latency connections between the various parts of a cache. In the following description for purposes of explanation specific memory sizes, bit arrangements, numbers, data transfer rates, etc. are set forth in order to provide a thorough understanding of the present invention. It will be apparent to one skilled in the art, however, that the present invention may be practiced without these specific details. In other instances, well known circuits and components are shown in block diagram form in order not to obscure the present invention unnecessarily.

Figure 1A:
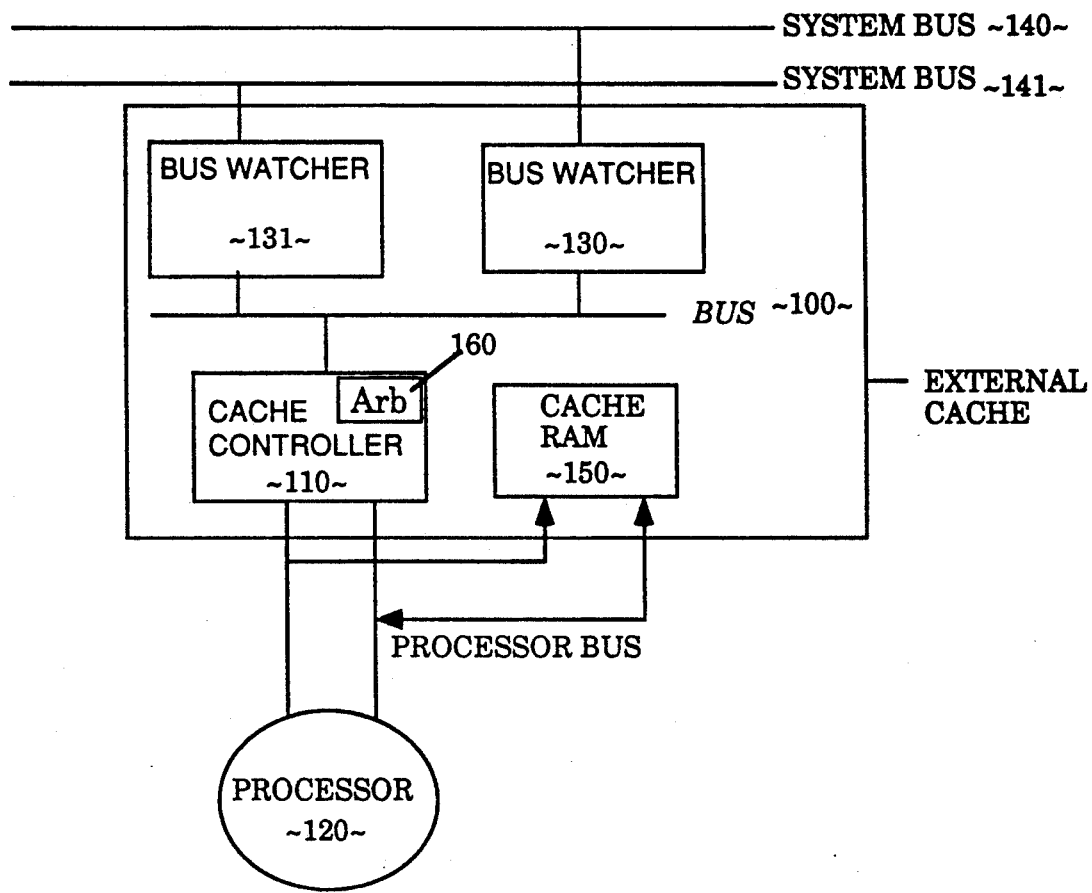
FIG. 1a is a schematic representation of a processor system employing the preferred embodiment of the present invention.
Figure 1B:
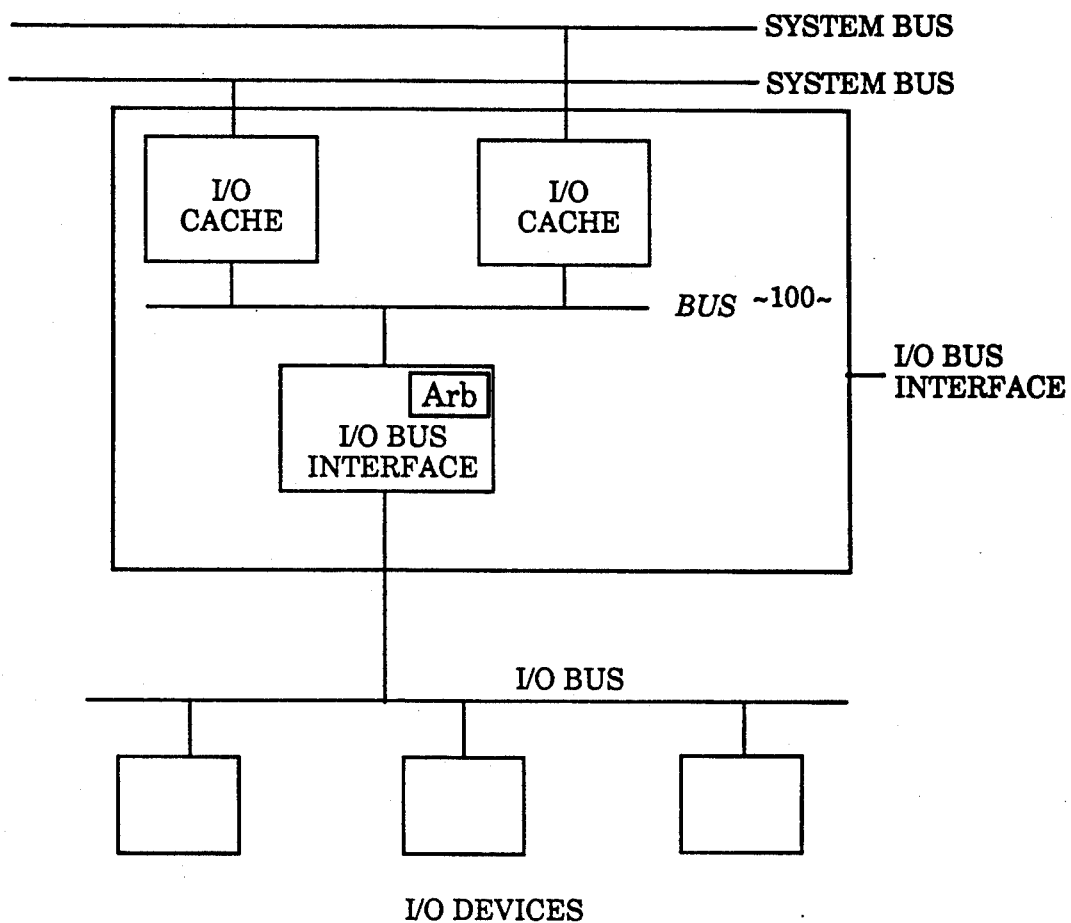
FIG. 1b is a schematic representation of an I/O bus interface employing the present invention.

The bus of the presently claimed invention is a high speed, synchronous, packet-switched inter-chip bus apparatus and method for transferring data between multiple system buses and a data processing device. The data processing device may be either a cache controller coupled to a processor, as shown in FIG. 1a, or an I/O bus interface coupled to an I/O bus, as shown in FIG. 1b. To simplify the description, terminology associated with FIG. 1a will be used throughout the present application. It should be born in mind, however, that the description for the cache controller embodiment also applies to the I/O bus interface, except where indicated otherwise.

Referring to FIG. 1a, the bus 100 connects a cache controller client chip 110 and the external cache RAM 150 of a processor 120 to a plurality of "bus watcher" client chips 130 and 131, each of which is coupled to a separate system bus 140 and 141. The bus 100 comprises a plurality of lines including multiplexed data/address path lines, parity lines, and various other command and control lines for flow control and arbitration purposes. Additionally, the bus 100 has a plurality of point-to-point arbitration wires for such devices as the bus watchers 130 and 131 and the cache controller 110.

The bus 100 allows the cache controller 110 to provide independent processor-side access to the cache 150 and the bus watchers 130 and 131 to handle functions related to bus snooping. An arbiter 160 is employed to allow the bus 100 to be multiplexed between the bus watchers 130 and 131 and the cache controller 110. Before a device can send a packet, it must get bus mastership from the arbiter 160. Once the device has control of the bus 100, it transmits the packet onto the bus 100 one cycle at a time without interruption. The arbiter 160 is implemented in the cache controller 110, and is specialized to provide low latency for cache misses and to handle flow control for packet-switched system buses 140 and 141.

BUS SIGNALS

Figure 2:
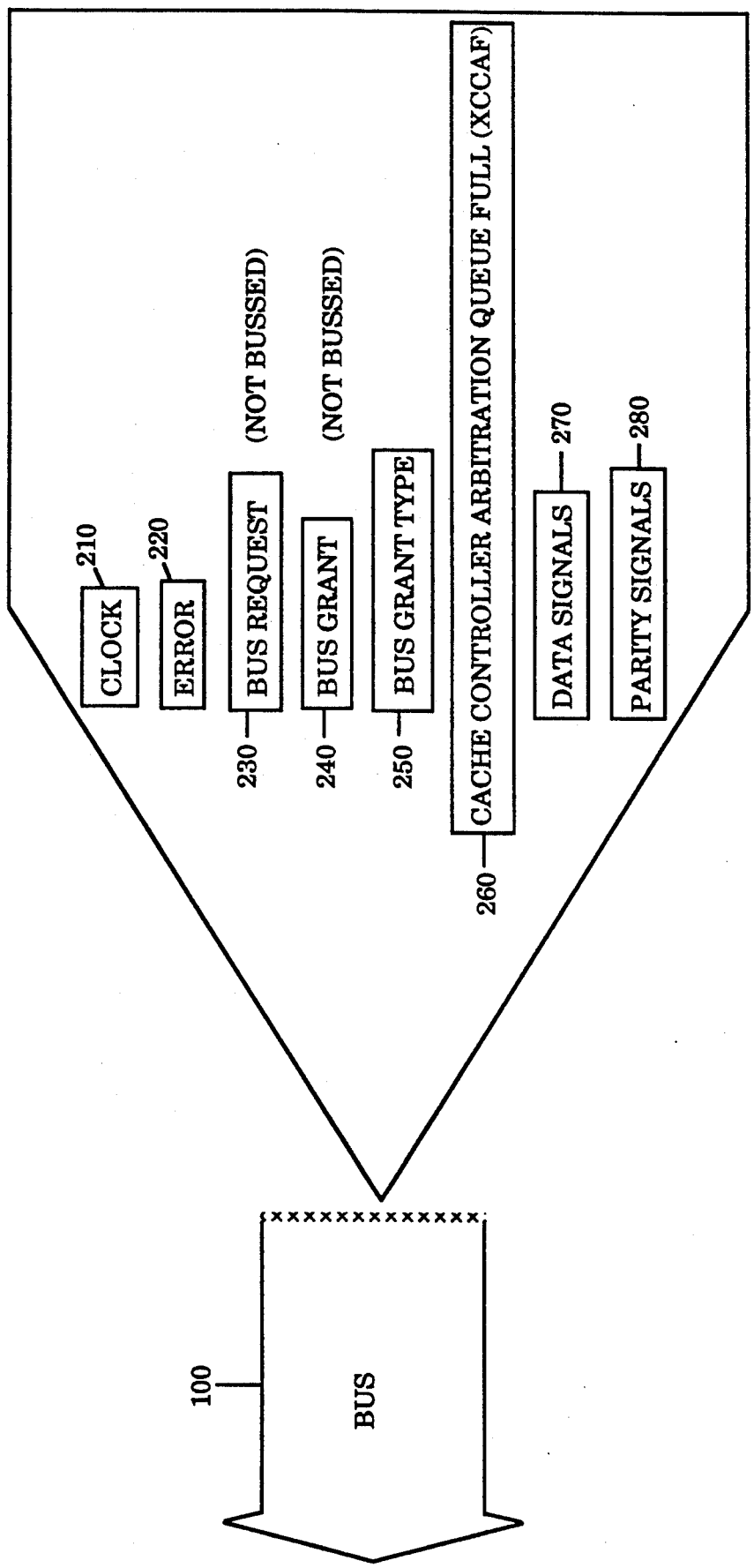
FIG. 2 diagrammatically illustrates the various sub-bus structures comprising the bus structure employing the teachings of the present invention.

Referring to FIG. 2, the signals on the bus 100 are divided into three functional groups: control signals, arbitration signals and data signals. The control signal group contains clock signals 210 and error signals 220; the arbitration group contains request signals 230, grant signals 240 and grant type 250 for each device; and the data signal group contains data signals 270 and parity 280 signal lines. In the present preferred embodiment, signals except the clock signals 210 and data signals 270 are encoded low true. Clock signals 210 provide the timing for all bus signals. The error signal 220 is used by the cache controller 110 (hereinafter "CC") to indicate an unrecoverable error in CC 110 or the processor 120 to the bus watcher clients 130 and 131 (hereinafter "BW"). In the present embodiment, the error signal 220 is driven active low. However, there is no corresponding error signal from the BWs to the CC because unrecoverable errors in BWs 130 and 131 are reported through the system bus 140 and 141. Currently, the bus 100 supports up to four BW's and four corresponding system buses solely due to the limitation by the cache controller 110. In the arbitration group, bus request signals 230 (XReqN:N being the index for the requesting BW) are used by a BW to request the bus 100 and to control the flow of packets being sent by the CC 110. In the present embodiment, a request to use the bus for sending data consists of two contiguous cycles, while flow control requests are one or two cycles. The signals are encoded as follows:

| First Cycle | Second Cycle | Meaning |
| --- | --- | --- |
| 00 | — | No Request |
| 01 | — | Block CC Request Queue (XOL) for 9 cycles |
| 01 | 01 | Block XOL and CC Reply Queue (XOH) for 9 cycles |
| 10 | L0 | Request bus at Priority BWLow for 2 cycles if $L=0$; 9 cycles if $L=1$ |
| 10 | L1 | Request bus at Priority BWLow for 2 cycles if $L=0$; 9 cycles if $L=1$; and block XOL and XOH for 9 cycles. |
| 11 | L0 | Request bus at Priority BWHigh for 2 cycles if $L=0$; 9 cycles if $L=1$. |
| 11 | L1 | Request bus at Priority BWHigh for 2 cycles if $L=0$; 9 cycles if $L=1$; and block XOL and XOH for 9 cycles. |

Currently, these signals are driven active low.

A grant signal 240 (XGntN) is used by the arbiter 160 to notify a requestor that it has been granted the bus mastership. This signal is asserted continuously for the number of cycles granted, and is never asserted unless the specific BW (BW-N) has made a request. If the BW Default Grantee mechanism (to be discussed more fully below) is implemented then it is possible for the grant signal to be asserted without a request having been made by the BW. In the present embodiment, the duration of the grant signal 240 is two cycles or nine cycles depending on the length of the packet requested. This signal is always driven. A grant-type signal 250 (XGTyp) is used to qualify the grant signal 240, and has exactly the same timing as the grant signal 240. Currently, this signal is driven active low. Finally a signal 260 (XCCAF) is used by the CC 110 to notify the BWs 130 and 131 that the queue the CC uses to hold BWLow arbitration requests is at its high water mark. (see discussion below).

The data group contains data 270 and parity 280 signals. The data signals 270 (XData) on the bus 100 are bi-directional signals that carry the bulk of the information being transported on the bus 100. During header cycles they carry address and control information; during other cycles they carry data. A device drives these signals only after the receiving a grant signal 240 from the arbiter 160. The parity signals 280 (XParity) also comprise a number of bi-directional signals that carry the parity information computed over the data signals 270. The parity for a given value of the data signals appear in the same cycle as the value.

ARBITRATION AND FLOW CONTROL

As will be described, the bus 100 also has an arbiter 160 that allows the bus 100 to be multiplexed between the BWs 130 and 131 and the CC 110. When either a BW or the CC has a packet to send, it makes a request to the arbiter 160 through its dedicated request lines 230 (XReqN), and the arbiter 160 grants the bus 100 using the corresponding grant line 240 (XGntN) and the bussed grant-type line 250 (XGTyp). In the present embodiment, the arbiter 160 implements four priority levels for flow control and deadlock avoidance purposes. Service at a given priority level is round-robin among contenders, while service between levels is based strictly on priorities. The arbiter 160 is implemented in the CC 110 because this is simpler and more efficient, as will be appreciated from the following description of the invention.

Figure 3:
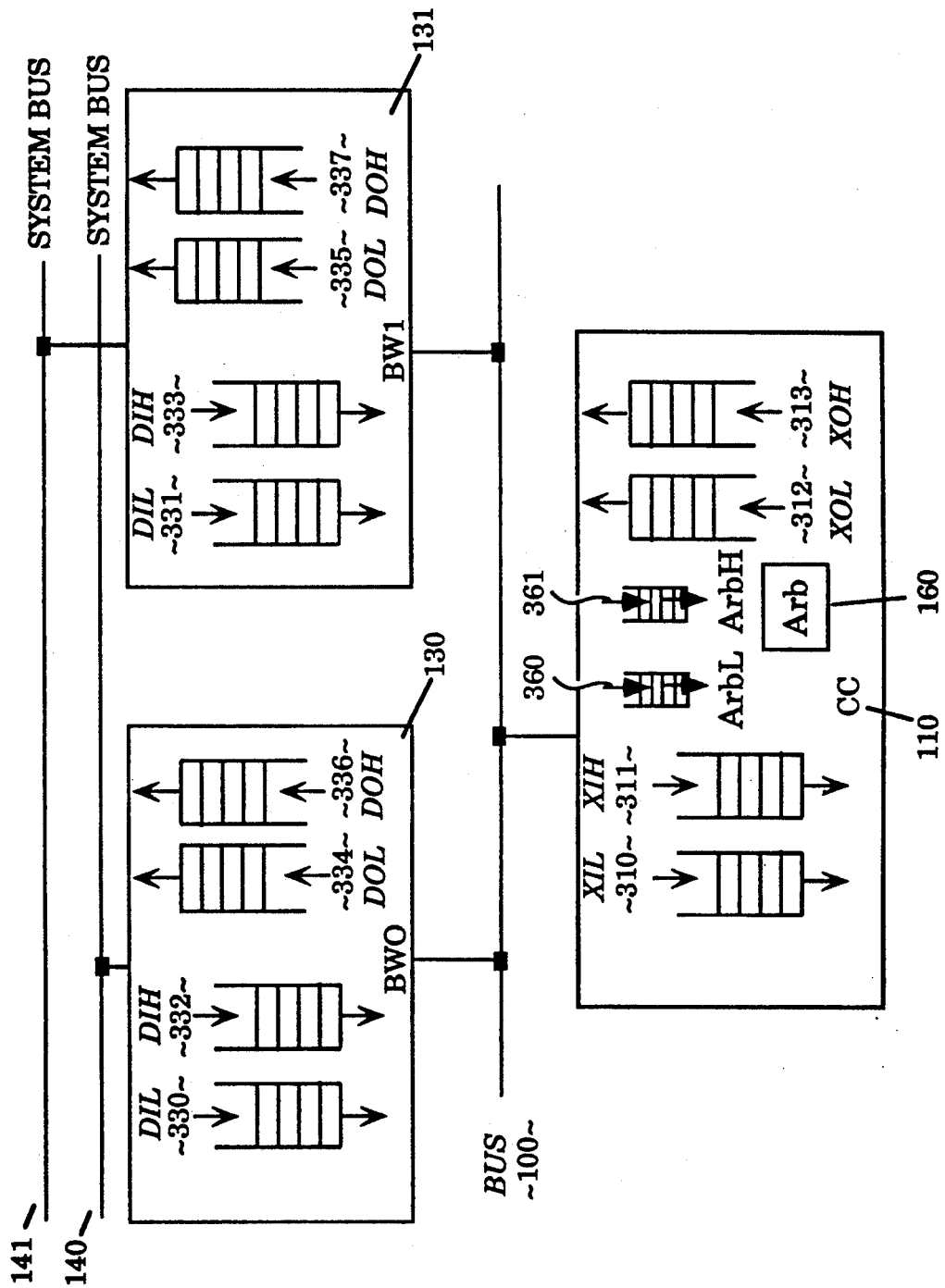
FIG. 3 diagrammatically illustrates the structure of queues in the bus watchers and the cache controller employing the teachings of the present invention.

Referring to FIG. 3, the bus 100 imposes the following FIFO queue structure on the BWs 130 and 131 and CC 110. Each BW has four system bus queues, two for output, two for input. The output queues, DOL 334 and 335 and DOH 336 and 337, are used to send packets at system bus priorities CacheLow and CacheHigh, respectively; the input queues, DIL 330 and 331 and DIH 332 and 333, hold packets that will be sent at bus priorities BWLow and BWHigh, respectively. The queue DIH 332 is used to hold only replies to packets originally sent by the CC 110. An implementation is also allowed to merge the queues DIL and DIH in the BWs, and XIL 310 and XIH 311 in the CC 110 if deadlock-free operation is still possible with this arrangement.

Referring to FIG. 3, the CC 110 also has four packet queues, two for input from the bus 100 and two for output to the bus 100. The input queues, XIL 310 and XIH 311, hold packets from DIL 330 and 331 and DIH 332 and 333, respectively. The output queue, XOL 312, is used to send out CC requests, while XOH 313 is used to send out CC replies. Additionally, each CC 110 has two queues, ArbLow 360 and ArbHigh 361, used to hold arbitration requests from the BWs at the priorities BWLow and BWHigh respectively. If the delay from the reception of packet on the system bus 140 and 141 to arbitration requests on bus 100 is fixed then these queues ensure that the packets from multiple system buses in each class (DIL or DIH) are serviced by the bus arbiter 160 in their system bus arrival order.

Referring again to FIG. 3, when packets are transferred from system buses 140 and 141 to CC 110 through bus 100 of the present invention, the following scheme is used to ensure that packets arriving on bus 100 are in the same order as they arrive on respective system buses 140 and 141. As an illustrative example, assume packet A arrives on system bus 140 at cycle 1 and packet B arrives on system bus 141 at cycle 4. An order-preserving implementation of the present invention will preserve the arrival order of packets A and B on system buses 140 and 141 as they are transferred to bus 100, i.e. packet A arriving on bus 100 before packet B. Conversely, if packet B arrives on system bus 141 before packet A arrives on system bus 140, then packet B is transferred onto bus 100 before packet A. Currently, the arrival order is preserved for packets entering the queues DIL 330 and 331.

The order-preserving implementation works as follows: when a packet arrives at the input of a BW, a request for control of bus 100 is sent to bus arbiter 160 a fixed number of cycles later. Currently, a request is sent to arbiter 160 two cycles after a packet arrives at the BW. When bus arbiter 160 receives requests for control of bus 100, it services the requests on a FIFO (First-in, first-out) basis, therefore preserving the system bus arrival order of packets.

In a case where both packets A and B arrive on their respective system buses 140 and 141 at the same cycle, then a fallback implementation is employed so that the packet from one pre-determined system bus is transferred first to bus 100. In the current embodiment, packets from BW0 are transferred to bus 100 first in the case of simultaneous arrival on the system buses. However, it will be apparent to those skilled in the art that other fallback schemes are also available for the case of simultaneous arrival.

The BWs 130 and 131 and CC 110 interact with the arbiter 160 through three dedicated wires—XReqN, and XGntN, and the bussed XGTyp 250. In the present preferred embodiment, the arbitration wires for the CC 110 are internal since the arbiter 160 is implemented in the CC 110, while those for the BWs 130 and 131 appear at the pins of the CC 110. A BW requests the bus 100 by using its XReqN lines as follows:

| First Cycle | Second Cycle | Meaning |
|---|---|---|
| 00 | 00 | No Request |
| 01 | 00 | Block XOL for 9 cycles |
| 01 | 01 | Block XOL and XOH for 9 cycles |
| 10 | L0 | Request Bus at Priority BWLow for 2 cycles if L = 0 and 9 cycles if L = 1. |
| 10 | L1 | Request Bus at Priority BWLow for 2 cycles if L = 0 and 9 cycles if L = 1 and block XOL and XOH for 9 cycles. |
| 11 | L0 | Request Bus at Priority BWHigh for 2 cycles if L = 0 and 9 cycles if L = 1. |
| 11 | L1 | Request Bus at Priority BWHigh for 2 cycles if L = 0 and 9 cycles if L = 1 and block XOL and XOH for 9 cycles. |

When the requestor is the CC 110, the Block portion of the codes are ignored by the arbiter 160. The following example illustrates the encoding in the above table.

| | |
|---|---|
| 00,00,00, . . . | No requests of any kind. |
| 01,00,01,00, . . . | Continuous request to block the XOL queue. Each request blocks the queue for 9 cycles but requests do not accumulate. For example 01,00,01 blocks the queue for a total of 11 cycles, not 18. |
| 01,01,01, . . . | Continuous request to block both the XOL and XOH queues. Again, requests do not accumulate. For example 01,01 blocks the queue for 10 cycles, not 18. |
| 10,00,11,10 | A 2 cycle BWLow request followed immediately by a 9 cycle BWHigh request. |
| 10,01,11,11 | A 2 cycle BWLow request followed immediately by a 9 cycle BWHigh request. In both requests the XOL and XOH queues are blocked. |

The arbiter 160 grants the bus 100 using the requesting client's XGntN line and qualifies this grant using the bussed XGTyp line 250. In the present embodiment, XGntN is asserted for either two consecutive cycles or nine consecutive cycles depending on the length of the packet requested. XGTyp specifies whether the current grant is for low priority or high priority; it is asserted for the duration in which the XGntN is asserted.

Figure 4:
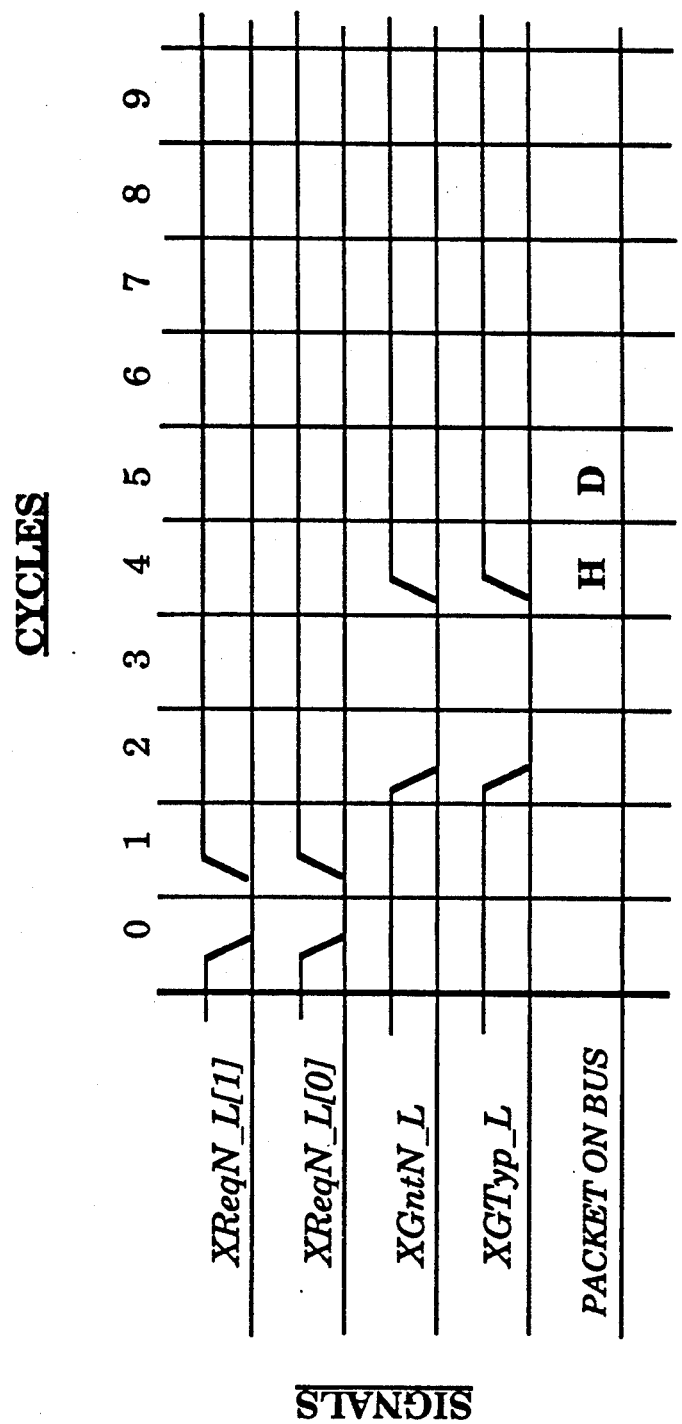
FIG. 4 is a timing diagram illustrating the arbitration timing for gaining access to the bus of the present invention.

Reference is now made to the generic arbitration timing diagram in FIG. 4. The requestor sends a request for a high priority two cycle packet; the arbiter 160 then responds two cycles later with the grant, and a packet appears on the bus 100 two cycles thereafter. If the arbitration latency is defined as the number of cycles from the assertion of the XReq signal on the bus 100 to the appearance of the packet header on the bus 100, then the resulting arbitration latency in FIG. 4 is four cycles. The actual latency depends on whether the bus 100 is busy, what the request priority is, and whether the requestor is a BW 130 and 131 or the CC 110.

In the present embodiment, the arbiters 160 supports four priorities: CCLow<BWLow<BWHigh<CCHigh. Servicing a request at a given level is round-robin while servicing a request between levels is based strictly on priority. Strict priority means that if a low priority request arrives at the arbiter 160 at the same time or after a high priority request, then a low priority request will never be serviced in preference to the high priority request. It will be appreciated that although a round-robin and strict priority system is employed by the present invention that other arbitration and priority schemes which ensure deadlock-free operation may be utilized.

Referring again to FIG. 3, when the CC 110 needs to send a packet from its XOL 312 queue, for example, a request to read a block from memory or a request to broadcast write to a location, it requests the bus 100 by using the CCLow priority. The priority CCHigh is used by the CC to send a packet from the XOH queue 313, for example, a reply to a system bus request to read a block that resides in the cache RAM 150. The priority BWLow is used by a BW to send packets from its DIL queue 330 and 331, for example, requests coming in on the system bus 140 and 141 from other processors. The priority BWHigh is used by a BW to send packets from its DIH queue 332 and 333, for example, replies from the system bus 140 and 141 to requests sent out earlier by the CC 110. The ordering of priorities in the above mentioned manner helps ensure that queues do not overflow and deadlock does not occur. However, once again it will be apparent to one skilled in the art that various other priority hierarchies may be defined to achieve the same objectives.

The arbiter 160 also provides mechanisms to prevent the queues receiving packets or arbitration requests over the bus 100 from overflowing. In the present embodiment, there are eight such queues: XIL 310, XIH 311, ArbLow 360 and ArbHigh 361 in the CC 110, and DOL 334 and 335 and DOH 336 and 337 in the BW 130 and 131. The arbiter 160 controls the flow of XIL 310 and XIH 311 by refusing to grant requests to any of the BWs when either of the queues is above its high water mark. As long as the BWs do not get grants, the BWs cannot send packets, and overflow is thus avoided. ArbLow 360 is flow-controlled by the arbiter 160 through the signal XCCAF 260 (CC Arbitration Flow). When the XCCAF 260 signal is asserted, all of the BWs assert a system bus pause, which stops the flow of those packets on the system bus 140 and 141 that could overflow BW queues. This ensures that no more arbitration requests are sent to ArbLow 360 in the CC 110. Arb-High 361 is prevented from overflowing by limiting the number of outstanding reply packets whose requests were sent by the CC 110 and which would end up in DIH 332 and 333. Again, ArbHigh 361 contains only requests for packets in DIH 332 and 333. The flows in DOL 334 and 335 and DOH 336 and 337 are controlled by having the BW signal block through its XReq lines. When a queue is above its high water mark, the BW sends a block request identifying XOL 312 or XOH 313 if there is no arbitration request being sent at the moment, otherwise it piggybacks the Block request on top of the arbitration request. Each time the arbiter 160 receives a block request (piggybacked or not) it blocks the appropriate queues for the requested number of cycles. Block requests are not accumulated, and so, for example, two contiguous block requests for nine cycles each will block the specific queue for eleven cycles, not eighteen cycles.

Figure 16:
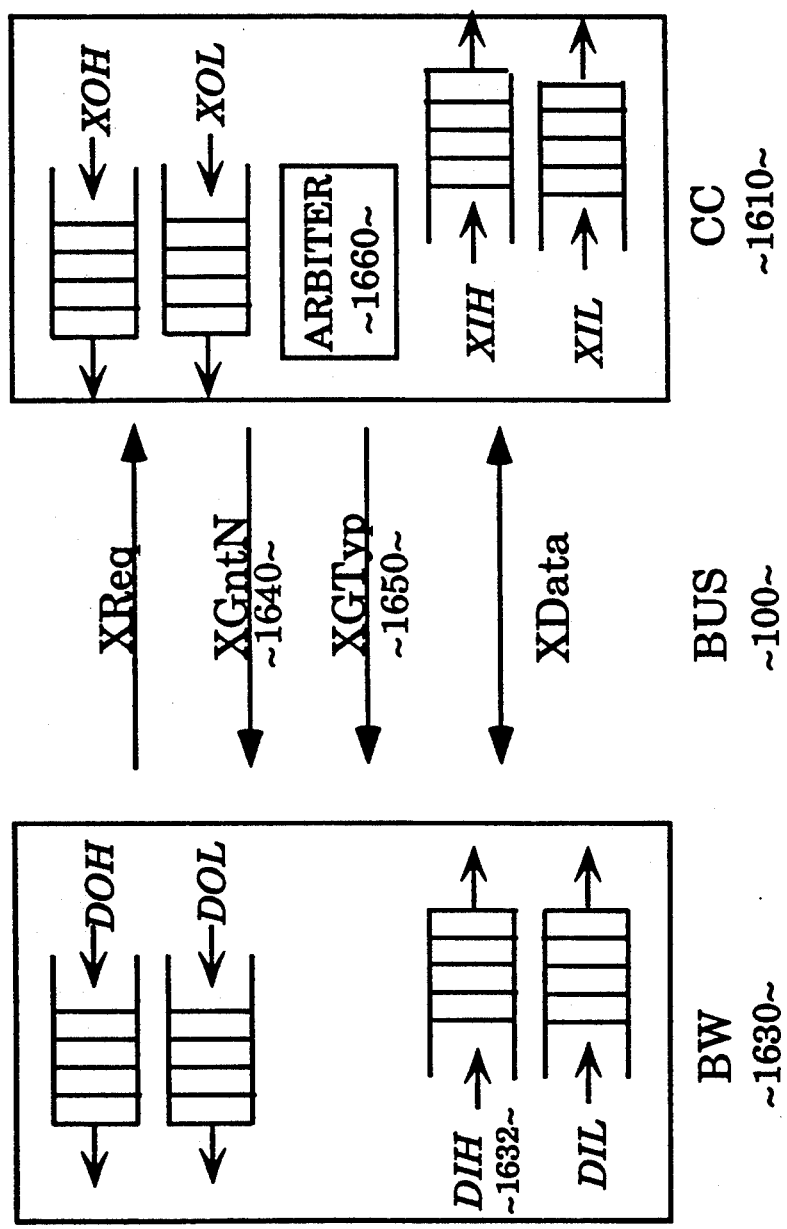
FIG. 16 diagrammatically illustrates the operation of the default grantee mechanism.

Reference is now made to FIG. 16 to illustrate the operation of the default grantee mechanism. Currently, the default grantee mechanism is employed to avoid the latency cycles during a cache miss due to the minimum arbitration latency of the BW 1630 or the CC 1610 as a bus requestor when the bus 100 is idle. However, it will be apparent to those skilled in the art that the default grantee mechanism can be implemented for other latency-critical operations as well. To implement the default grantee, the arbiter 1660 gives a bus grant to a client, as the default grantee, even though the client has not made a request. The grant is made in anticipation of a real request, and maintained only as long as there are no requests from other clients.

The arbiter 1660 is always in one of the three states: No default grantee (NDG), the CC is the default grantee (CCDG), and one of the BW's is the default grantee (BWDG). As long as the CC 1610 has no outstanding packets for a read miss, the arbiter 1660 is in the CCDG state. When a read miss occurs, the CC 1610 will incur zero arbitration latency because it already has the grant. At this time the arbiter 1660 switches to BWDG, asserts the XGnt signal 1640 for the BW 1630 to which a request is made, and also asserts the qualifying XGTyp 1650 to indicate that the default grant applies only to requests from the DIH queue 1632. When the miss reply packet comes to the BW 1630, the BW 1630 incurs zero latency if there are no other arbitration requests pending for the bus 100. Thus, for a bus 100 which is mostly idle, the default grantee mechanism will save the minimum arbitration latency cycles from the BW 1630 and from the CC 1610.

Referring to FIG. 16, when a BW 1630 is the default grantee it must be prepared for the event that its XGntN line 1640 is de-asserted by the CC 1610 while the BW 1630 is about to send, or is actually sending a packet from its DIH queue 1632. This happens when the CC 1610 or another BW makes a request while the BW 1630 is the default grantee. There is no way for the arbiter to know that the BW 1630 is about to send because a packet header and the request signal appear simultaneously on the pins of that BW 1630; therefore, there is no appropriate time for the arbiter 1660 to de-assert the BW's XGntN line 1640. If the BW 1630 has not started to send when XGntN 1640 is de-asserted, it must wait until it gets XGntN 1640 again before it can send the packet. If it has started sending, then it must continue the transmission to complete even though XGntN 1640 has been de-asserted. The arbiter 1660 implementation must ensure that the CC 1610 or other BW would not send a packet at the same time as the BW 1630 that is the default grantee. This problem does not arise when the CC 1610 is the default grantee, because the arbiter 1660 is aware of the request due to the internal request line in the CC soon enough.

One consequence of having a default grantee mechanism is that the arbitration latency for a device that is not the default grantee is greater than it would have been without the mechanism. In the BW of the present embodiment, the latency increases from four cycles to five. However, this increase has little impact on the performance because it affects only references to shared data from other processors, which are infrequent and not latency-critical. If BWDG is implemented, the latency for the CC increases from one to three, but only for the references made while a miss is already outstanding. Since these references are either shared writes, write misses, or prefetches, performance is virtually unaffected.

Figure 5:
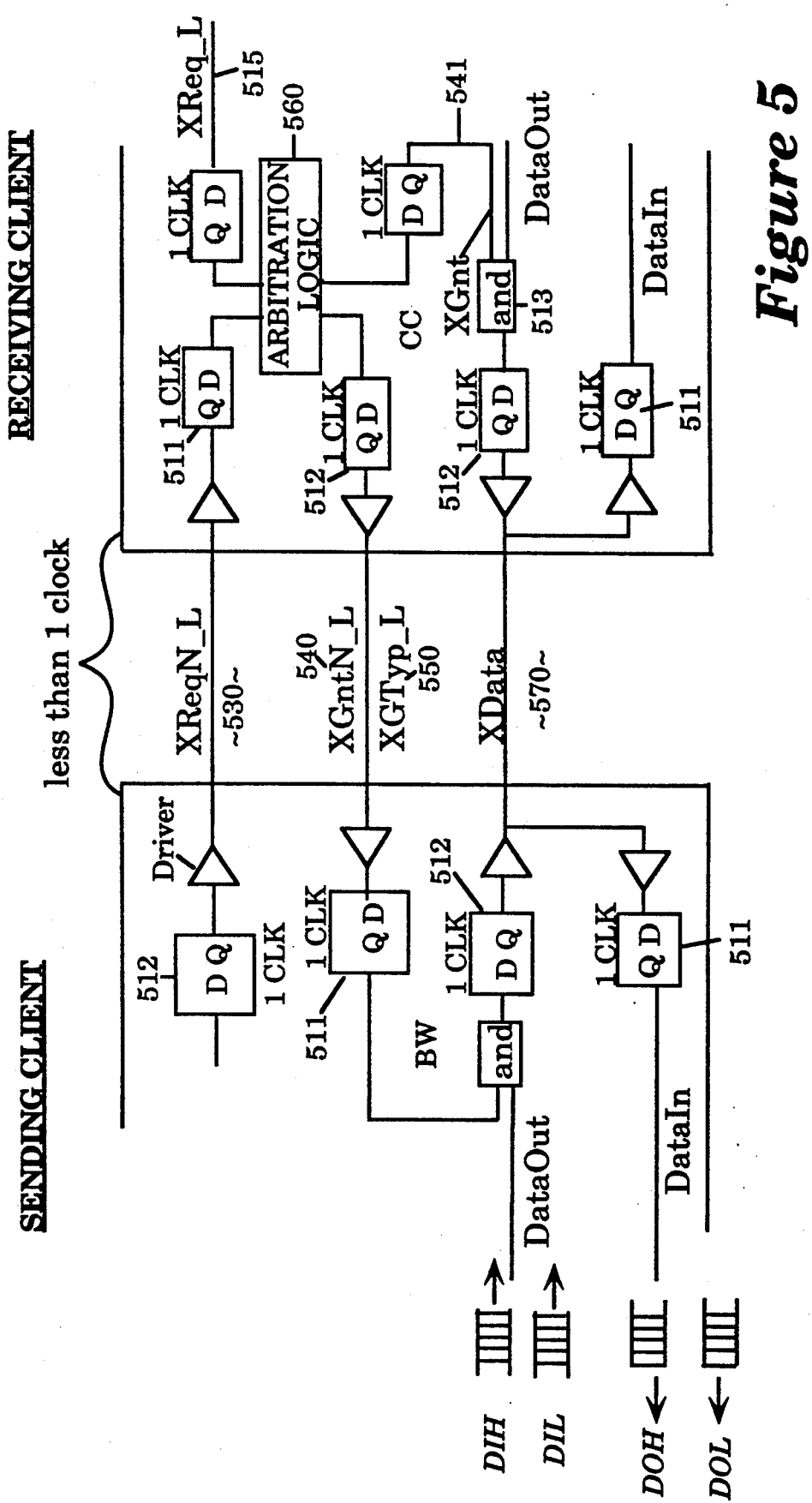
FIG. 5 illustrates the bus interface between a bus watcher and the cache controller for the purpose of computing minimum arbitration latency.

Reference is now made to FIG. 5, for the purpose of illustrating pipeline delays between the BWs and CC, and for computing minimum arbitration latency. With respect to the speed of transmission and logic, the following assumptions are made:

The path between inputs and outputs of the arbitration logic 560 is combinational and its delay is less than one clock cycle. The arbitration logic 560 also contains a state machine and the ArbHigh and ArbLow FIFOs without adding a pipeline delay to the best-case path between inputs and outputs.

XReqN 530, XGntN 540, XGTyp 550 and Xdata 570 can be transferred from the flip-flop 512 in the sending client to the flip-flop 511 in the receiving client in less than one clock cycle.

The delayed version of XGntN 541 can go through the AND gate 513 and be transferred to the outbound flip-flop 512 in less than one clock cycle.

Figure 6:
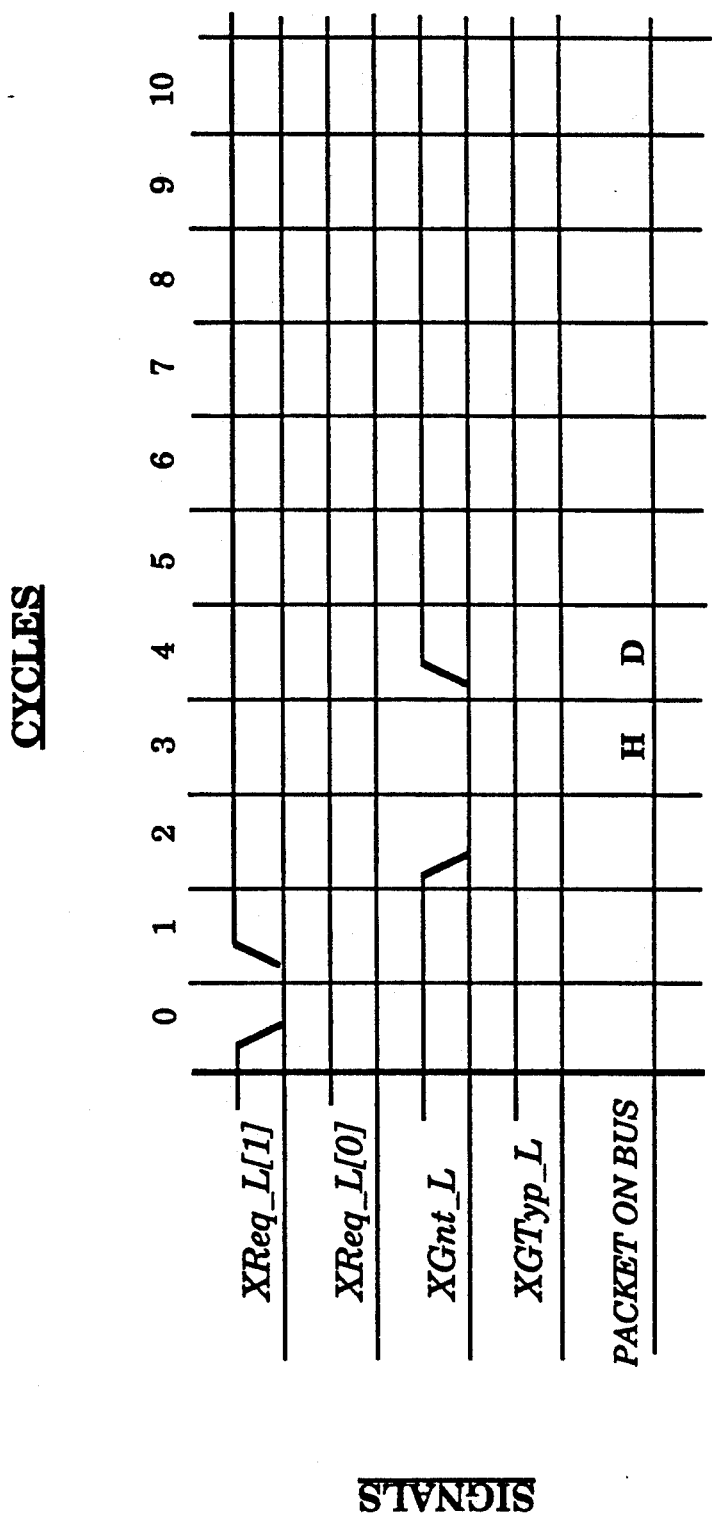
FIG. 6 is a timing diagram illustrating the arbitration sequence when the cache controller requests a low priority 2 cycle packet and the cache controller is not the default grantee.
Figure 7:
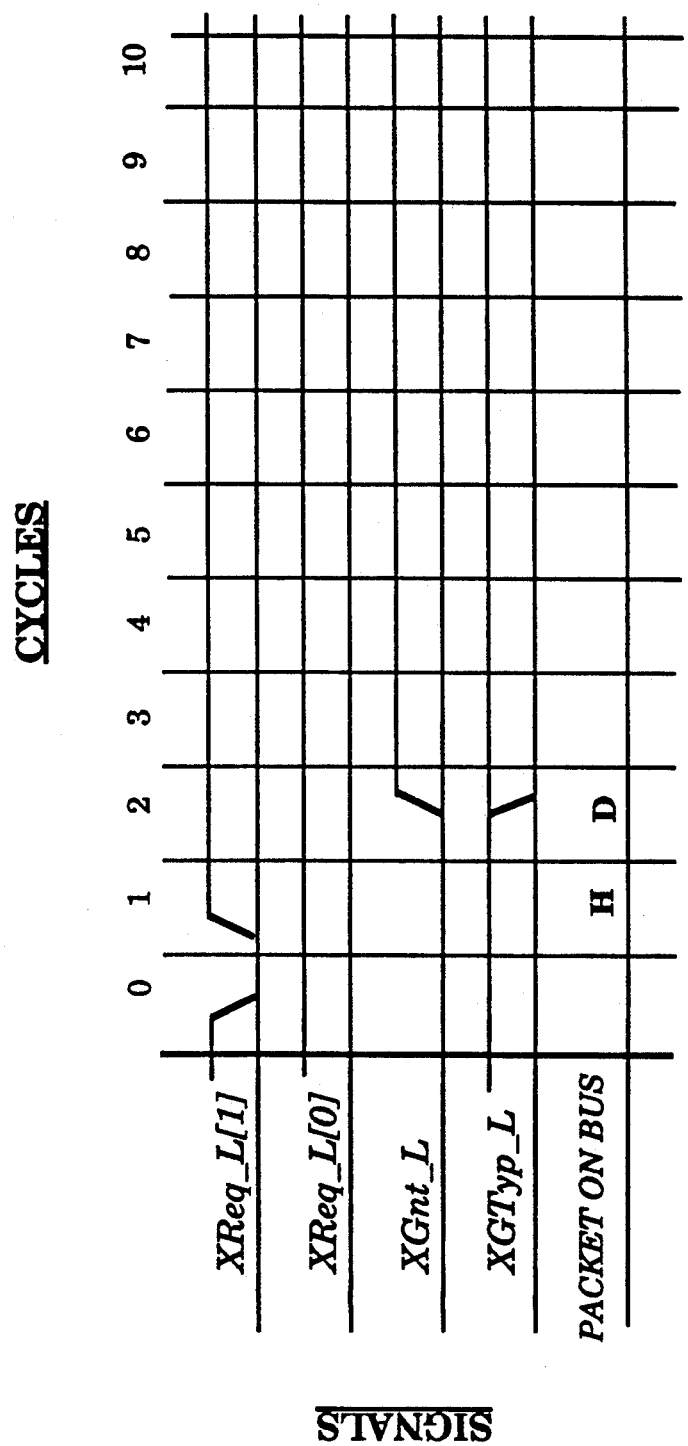
FIG. 7 is a timing diagram illustrating the arbitration sequence when the cache controller requests a low priority 2 cycle packet and the cache controller is the default grantee.
Figure 8:
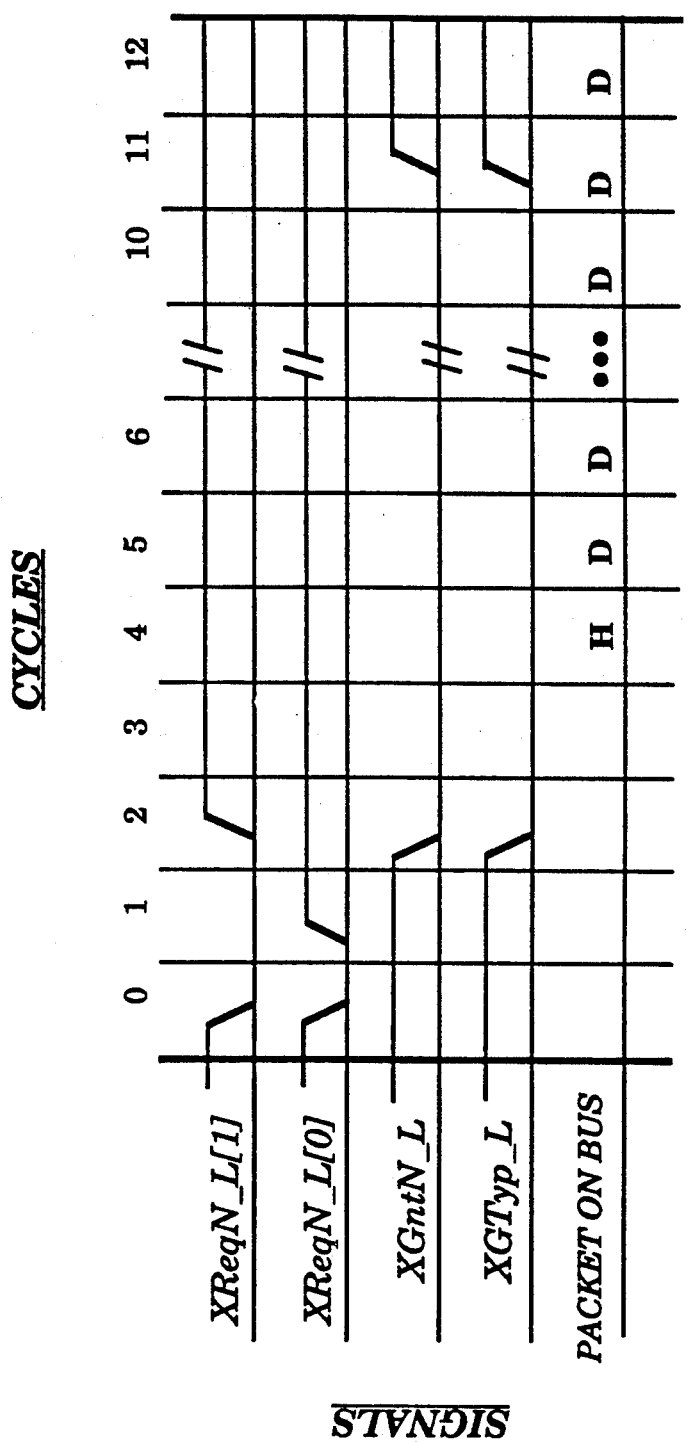
FIG. 8 is a timing diagram illustrating the arbitration sequence when the bus watcher requests a high priority 9 cycle packet and the bus watcher is not the default grantee.

Given the schematics in FIG. 5, it is possible to compute the minimum arbitration latency for the cases with and without a default grantee. As stated before, arbitration latency is measured from when XReqN 530 is on the bus to when the corresponding header is on the bus; for the CC, whose XReq 515 is internally coupled to the arbitration logic 560 in the CC, XReq 515 is one pipeline away from the bus, and one cycle must be subtracted from the delay between XReq 515 and the header on the bus. Without CCDG, the minimum arbitration latency is two cycles as shown in FIG. 6; with CCDG it is zero cycles as shown in FIG. 7, when XData 570 is on the bus at the next cycle to XReg 515. Without BWDG, the minimum latency is four cycles as shown in FIG. 8; with BWDG it is zero cycles. Thus, if both the BWDG and CCDG were implemented it would save six cycles, and if only the CCDG is implemented it would save two cycles.

FIG. 6 illustrates the minimum-latency timing diagram for the illustrative circuit in FIG. 5 when the CC requests a low priority two-cycle packet and the CC is not the default grantee. Note that the header cycle appears on the bus only after XGnt is asserted (low-true).

FIG. 7 illustrates the minimum-latency timing diagram for the illustrative circuit in FIG. 5 when the CC requests a low priority two-cycle packet, and the CC is the default grantee. When compared to no CCDG as in FIG. 6, the header cycle appears on the bus two cycles sooner, because the XGnt is already asserted in the CCDG case. Currently, the CC can use the default grantee either for low priority packets or for high priority packets, but not both. This is because XGTyp is produced too late for the bus sending logic to know whether to send from the XOL queue or from the XOH queue; this decision therefore must be made statically. For optimizing latency for only request packets, this restriction is inconsequential.

FIG. 8 illustrates the minimum-latency timing diagram for the illustrative circuit in FIG. 5 when the BW requests a high priority nine cycle packet and the BW is not the default grantee.

BUS PROTOCOL

The bus operation can be understood in terms of three levels: cycles, packets, and transactions. A cycle is one period of the bus clock; it forms a unit of time and one-way information transfer. All cycles on the bus fall into one of the four categories: Header, Data, Memfault, and Idle. A Header cycle is always the first cycle of the packet; Data cycles normally constitute the remaining cycles; Memfault cycles are used to indicate an error in one of the data cycles of a packet; and Idle cycles are those during which no packet is being transmitted on the bus. Currently, Header and Memfault cycles are encoded using the all-even encoding of the X-Parity wires. Data and Idle cycles are encoded using the all-odd encoding of the X-Parity wires. Memfault is distinguished from Header by the fact that Memfault can only occur in place of one of the Data cycles of a packet. Data is distinguished from Idle by the fact that Data cycles occur within a packet whereas Idle cycles do not.

A packet is a contiguous sequence of cycles that constitute the next higher unit of transfer. The first (header) cycle of the packet carries address and control information, while subsequent cycles carry data. Currently, packets come in two sizes in the present embodiment: two cycles and nine cycles. A device sends a packet after arbitrating for the bus and getting the grant. Packet transmission by a device is uninterruptable once the header cycle has been sent. A data command field in the packet encodes the packet type, including whether the packet is a request or a reply and the transaction type.

A transaction consists of a pair of packets (request and reply) that perform some logical function. Packets usually come in pairs, but there are exceptions to this. For a FlushLine transaction (described below), several reply packets may be generated for one request. For a transaction that times out, no reply packet may be generated.

BUS COMMANDS

The bus defines two types of commands that are contained in the header cycle of each packet: a data command, used by the sender to Get or Put data from or to another client. This data may or may not be directly accessible to the receiving client, but this fact is irrelevant to the bus protocol in the present preferred embodiment. The receiving client is expected to process the request in an appropriate way: for a Put request, the client will do the action and acknowledge it, and for a Get request, the client will retrieve the data and return it through a subsequent reply packet. The header cycles also contain a tag command, which is used to keep the bus-side tags inside the BWs consistent with the processor-side tags inside the CC.

With respect to sending and receiving packets on the bus using the bus commands, each device has a unique identification (Device Identification). Multiple devices can reside within a client connected to the bus. Each client can use any device identifications allocated to it, subject to the following constraints in the present embodiment:

One set of device identifications is reserved for the CC client; and such numbers also identify the device within the CC. Currently, device identification numbers of the form "0dddd" are reserved for the CC; and "dddd" is the number for one of up to 16 devices within the CC.

Another set of numbers is reserved for the BW clients; such numbers also identify the device within the BW. Currently, device identification numbers of the form "1dddd" are reserved for the BW clients; and dddd is the number for one of up to 16 devices within the BW.

Figure 9:
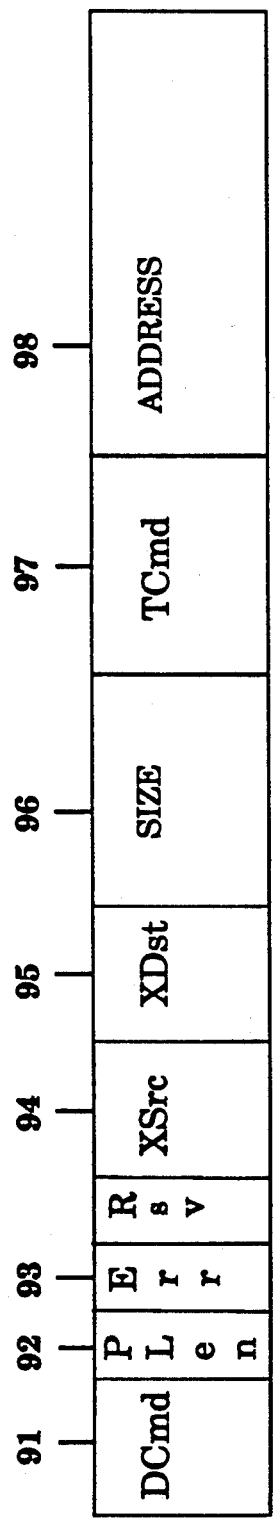
FIG. 9 diagrammatically illustrates the various components comprising the header cycle.

Reference is now made to FIG. 9, where the format of a header cycle is shown. In the present embodiment, header cycles are indicated by the all-even encoding on the parity wires. It will be apparent to those skilled in the art that various other encoding schemes may be employed to achieve the same objective. Currently, the 64 bits in a header cycle convey the information regarding the data command 91 (DCmd), length of packet 92 (PLen), error 93 (Err), source identification 94 (XSrc), destination device identification 95 (XDst), size 96, tag command 97 (TCmd), and address 98, to be described more fully below.

DCmd 91 specifies data transfer commands. In the present embodiment, two sizes of data may be transferred: a single, which fits in one 64-bit cycle, and a block, which is eight cycles. Currently, the least significant bit of the data command field also specifies whether the packet is a request or a reply.

The data commands in the form of DCmd 91 could be divided into three functional groups: the memory group contains commands directed to a system-wide physical address space. The I/O group contains commands directed to a distinct system-wide I/O address space whose contents are never cached. The I/O space is used primarily to access I/O devices, but it also provides a way to read and write the state of system components through the system bus; such access is provided for diagnostic purposes. Finally the miscellaneous group contains commands for memory management and interrupt handling. In the present embodiment the encoding of the data commands is as follows:

TABLE 1

Table of Data Commands

| Group | Command Name | Encoding | Packet Length |
|---|---|---|---|
| Memory | NoopRqst / NoopRply | 00000 0/1 | 2/2 cycles |
|  | — | 00001 0/1 | — |
|  | NCGetBlockRqst / Rply | 00010 0/1 | 2/9 cycles |
|  | FlushLineRqst / Rply | 00011 0/1 | 2/9 cycles |
|  | GetSingleRqst / Rply | 00100 0/1 | 2/2 cycles |
|  | PutSingleRqst / Rply | 00101 0/1 | 2/2 cycles |
|  | GetBlockRqst / Rply | 00110 0/1 | 2/9 cycles |
|  | PutBlockRqst / Rply | 00111 0/1 | 9/2 or 9/9 cycles |
| IO | IOGetSingleRqst /Rply | 01000 0/1 | 2/2 cycles |
|  | IOPutSingleRqst / Rply | 01001 0/1 | 2/2 cycles |
|  | IOGetBlockRqst / Rply | 01010 0/1 | 2/9 cycles |
|  | IOPutBlockRqst / Rply | 01011 0/1 | 9/2 cycles |
| Misc. | — | 01100 0/1 | — |
|  | — | 01101 0/1 | — |
|  | Demap Rqst / Rply | 01110 0/1 | 2/2 cycles |
|  | InterruptRqst / Rply | 01111 0/1 | 2/2 cycles |
| Mem- | — | 10000 0/1 | — |

TABLE 1-continued

Table of Data Commands

| Group | Command Name | Encoding | Packet Length |
|---|---|---|---|
| ory | — | 10001 0/1 | — |
| | — | 10010 0/1 | — |
| | — | 10011 0/1 | — |
| | — | 10100 0/1 | — |
| | SwapSingleRqst / Rply | 10101 0/1 | 2/2 cycles |
| | — | 10110 0/1 | — |
| | — | 10111 0/1 | — |
| IO | — | 11000 0/1 | — |
| | IO SwapSingleRqst / Rply | 11001 0/1 | 2/2 cycles |
| | — | 11010 0/1 | — |
| | — | 11011 0/1 | — |
| Misc. | — | 11100 0/1 | — |
| | — | 11101 0/1 | — |
| | — | 11110 0/1 | — |
| | — | 11111 0/1 | — |

The length of the packet (PLen) 92 is also indicated in the header cycle. For the present preferred embodiment, the header cycle can specify either a two-cycle packet or a nine-cycle packet. The error field (Err) 93 in the header cycle is defined only for reply packets. It indicates that the corresponding request packet encounters an error. The second cycle of an error reply provides additional error information and the remaining cycles, if any, are ignored. The length of an error reply packet is the same as the length of the corresponding normal reply packet. Any bit that is not used is set to zero. The source field (XSrc) 94 specifies the Device Identification of the device transmitting the packet, while the destination field (XDst) 95 specifies the Device Identification of the device that is the intended recipient of this packet. If the packet is a request, only the device indicated by the XDst 95 can generate a reply. When XDst 95 specifies a BW, there will be bits in the address field 98 in the header cycle specifying the BW number. The size field 96 specifies the number of bytes of data that will be transported by the current transaction. In the present preferred embodiment, the 3-bit size field is specified as follows:

| | Size Bits | |
|---|---|---|
| Single | 000 | 1 Byte |
| | 001 | 2 Bytes |
| | 010 | 4 Bytes |
| | 011 | 8 Bytes |
| Block | 100 | Undefined |
| | 101 | 64 Bytes |
| | 110 | Undefined |
| | 111 | Undefined |

In each case the datum is contiguous and self-aligned within its container. Thus if the size is a byte, it starts on a byte boundary; if it is 2 bytes, then it starts on a 16-bit boundary, and so on. The location of the datum is specified by the low-order bits of the Address field 98 to be described below.

The address field 98 in the header cycle identifies a byte in a single or block addressed by the current packet. Blocks and singles are required to be contiguous and self-aligned within the address space. When fewer than the allocated bits are used in the address field 98, the unused bits must be in the high order part of the field and be set to zero. In the present preferred embodiment, the ordering of bytes within a block is "big-endian"; that is, low order address bits equal to zero specifies the most significant byte in the single or block. When the addressed quantity is a single, the low order three bits of the address field 98 specified byte 0 (the leftmost byte) within the quantity. Thus, for a double word, the low order three bits of the address field are zero; for a word the low order two bits are zero, and for a half-word the low order bit is zero. When the addressed quantity is a block, the low order 3 bits are zero.

Reference is now made to the various data commands as shown in Table 1 below. The Noop command indicates that no data is being transferred. It is useful because it allows the tags of an entry to be manipulated through the tag command without having to transfer data. In the present embodiment a Noop request packet is two cycles long, the first being the header and the second cycle being unused. A Noop reply packet is used to reply to a Noop request. As shown in Table 1, the data command field in a Noop reply packet differs from that of a Noop request packet only in the reply/request bit; and the destination field 95 is identical to the request packet's source field 94.

NCGetBlock is used by a bus device to read a block from the physical address space when it does not intend to cache the block. An NCGetBlockRqst packet requests that the block specified by the address field 98 in the header be returned through an NCGetBlockRply. In the present preferred embodiment, the packet is two cycles long. The first cycle contains the header, while the second cycle is unused. The NCGetBlockRply packet is a response to an earlier NCGetBlockRqst. In the present embodiment, the packet is nine cycles long. The header cycle reflects most of the information in the request header, while the eight cycles of data supply the requested block in cyclic order, where the cycle containing the addressed byte is delivered first followed by cycles with increasing address MOD 8. With the exception of the request/reply difference, all other fields are the same as in the header cycle, and the destination field 95 is identical to the request packet's source field 94. The low order three bits of address 98 are ignored and are set to zero.

The FlushLine command is used to transfer a line from the CC to a BW for the purpose of writing it back to main memory. A FlushLineRqst packet is always initiated by the CC. It requests the CC to return those blocks of the line that need to be written back, i.e. those that have the owner set. In the present preferred embodiment, the packet is two cycles long. The first cycle contains the header, while the second cycle is unused. A FlushLineRply packet is a response to an earlier FlushLineRqst. The packet is nine cycles long. The header cycle reflects most of the information in the request header, while the eight cycles of data supply the requested block in normal order, where the cycle containing byte 0 of the block is delivered first followed by cycles with increasing address. In the present preferred embodiment, the lower six bits of the address field are ignored, and are set to zero. With the exception of the request/reply difference in the header cycle, all other fields are the same as in the request packet, and the destination field 95 is identical to the request packet's source field 94. The number of the block within the line to be flushed is also provided in the address field 98.

A FlushLineRqst packet may generate more than one FlushLineRply packet because a cache line contains multiple blocks. The destination field 95 in each reply packet is set to the Device Identification of the BW such that all FlushLineRply packets are sent to the same BW. There is no provision for cross-BW flushes in the present preferred embodiment.

Figure 10:
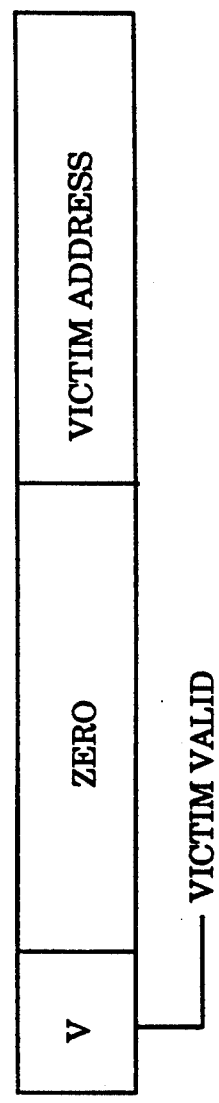
FIG. 10 diagrammatically illustrates the various components comprising the victim cycle for the GetSingle and GetBlock commands.

The GetSingle command is used to fetch a single (64 bits) of data from the 36-bit physical address space. A GetSingleRqst packet requests that the single specified by the size 96 and address 98 fields in the header cycle be returned through a GetSingleRply. A GetSingleRqst packet is two cycles long. The first cycle is the header, while the second cycle contains the address of the block being victimized, if any. The format of the victim cycle is shown in FIG. 10. A valid bit indicates whether the victim address is valid. This format applies to all packets that contain a victim cycle.

A GetSingleReply packet contains a header, which reflects most of the information in the request header, and data, which supplies the requested single. With the exception of the request/reply difference in the header cycle, all other fields are the same as in the request packet; and the destination field 95 is identical to the request packet's source field 94.

The PutSingle command is used to store a single (64 bits) of data into the 36-bit physical address space. A PutSingleRqst packet requests that a given value, which may be a byte, a half-word, a word, or a double-word, be written into the single specified by the size 96 and address 98 fields of the header. A PutSingleRply packet is used to acknowledge an earlier PutSingleRqst. It contains a header reflecting most of the information in the request header and the data to be written just as in the request packet. With the exception of the request/reply difference in the header cycle, all other fields are the same as in the request packet, and the destination field 95 is identical to the request packet's source field 94.

The SwapSingle command is used to perform an atomic load-store on a single (64 bits) of data in the 36-bit physical address space. A SwapSingleRqst packet requests that a given value, which may be a byte, a half-word, a word, or a double-word, be atomically written into the single specified by the size 96 and address 98 fields of the header and the old value be returned. In the present preferred embodiment, a SwapSingleRqst is two cycles long, with the first being the header and the second containing the value to be written. A SwapSingleRply packet is used to acknowledge an earlier SwapSingleRqst. It contains a header, which reflects most of the information in the request header, and the data, which is to be written, just as in the request packet. With the exception of the request/reply difference in the header cycle, all other fields are identical, and the destination field 95 is identical to the request packet's source field 94.

The GetBlock command is used to read a block from the physical address space with the intent of cacheing it. A GetBlockRqst packet requests that the block specified by the address field 98 in the header cycle be returned through a GetBlockRply. A GetBlockRqst packet contains the header and the address of the block being victimized, if any. FIG. 10 also shows the format of the victim cycle.

A GetBlockReply packet is a response to an earlier GetBlockRqst. The packet contains the header cycle reflecting most of the information in the request header and the data supplying the requested block in cyclic order, where the cycle containing the addressed byte is delivered first followed by cycles with increasing address MOD 8. With the exception of the request/reply difference in the header cycle, all other fields are the same as in the request cycle, and the destination field 95 is identical to the request packet's source field 94. In the present embodiment, the low order 3 bits of the address field 98 are ignored, and are set to zero since the transaction involves a complete block.

The PutBlock command is used to write a block into the physical address space. A PutBlockRqst packet requests that a given value be written into the block specified by the address field 98 of the header. In the present embodiment, a Putblock packet is nine cycles long. The first cycle is the header, while the remaining cycles, which are in normal order, contain the value to be written. Currently, Bits[5..0] of the address field are ignored, and are zero.

A PutBlockRply packet is a response to an earlier PutBlockRqst. In the present embodiment, there are two sizes of PutBlockRply: two cycles and nine cycles. A two-cycle PutBlockRply simply acknowledges that the PutBlockRqst requested earlier has been done. The first cycle is the header while the second cycle is unused (its value is "don't care"). A nine-cycle PutBlockRply not only acknowledges the PutBlockRqst, but also supplies the data to be written, which are in normal order. In both types of packet, with the exception of the request/reply difference in the header cycle, all other fields are identical, and the destination field 95 is identical to the request packet's source field 94. Currently, the low order 6 bits of the address field 98 are ignored, and are set to zero.

The IOGetSingle command is used to read a single from the I/O address space. An IOGetSingleRqst packet requests that the single specified by the size 96 and address 98 fields in the header cycle be returned through an IOGetSingleRply. In the present embodiment, an IOGetSingleRqst packet is two cycles long. The first cycle contains the header, while the second cycle is unused. An IOGetSingleRply packet is a response to an earlier IOGetSingleRqst. The packet is two cycles long. The first cycle contains the header, while the second cycle supplies the requested data. With the exception of the request/reply difference in the header cycle, all other fields are identical, and the destination field 95 is identical to the request packet's source field 94.

The IOPutSingle command is used to write a single into the I/O address space. An IOPutSingleRqst packet requests that a given value, which may be a byte, a half-word, a word, or a double-word, be written written into the single specified by the size 96 and address 98 fields of the header. In the present embodiment, the packet is two cycles long. The first cycle contains the header, while the second cycle contains the value to be written. An IOPutSingleRply packet acknowledges that an earlier IOPutSingleRqst is complete. The packet is 2 cycles long. The first cycle contains the header, while the second cycle is unused. With the exception of the request/reply difference in the header cycle, all other fields are identical, and the destination field 95 is identical to the request packet's source field 94.

The IOSwapSingle command is used to atomically store a single into the I/O address space and return the old value. An IOSwapsingleRqst packet requests that a given value, which may be a byte, a half-word, a word, or a double-word, be written into the single specified by the size 96 and address 98 fields of the header and the old value be returned. In the present embodiment, the packet is two cycles long. The first cycle contains the header, while the second cycle contains the value to be written. An IOSwapSingleRply packet acknowledges that an earlier IOswapSingleRqst is complete. The packet is two cycles long. The first cycle contains the header, while the second cycle contains the data returned by the destination device for the atomic load-store. With the exception of the request/reply difference in the header cycle, all other fields are identical, and the destination field 95 is identical to the request packet's source field 94.

The IOGetBlock command is used to read a block of data from the I/O address space. An IOGetBlock Rqst packet requests that the block specified by the address field in the header be returned through an IOGetBlockRply. In the present embodiment, the packet is two cycles. The first cycle contains the header, while the second cycle is unused. An IOGetblockRply packet is a response to an earlier IOGetBlockRqst. The packet is nine cycles long. The header cycle reflects most of the information in the request header, while the data cycles supply the requested block in normal order. Currently, Bits[5..0] of the address field are ignored, and are set to zero. With the exception of the request/reply difference in the header cycle, all other fields are identical, and the destination field 95 is identical to the request packet's source field 94.

The IOPutBlock command is used to write a block of data into the I/O address space. An IOPutBlock packet requests that a given value be written into the block specified by the address field of the header. In the present embodiment, the packet is nine cycles long. The first cycle contains the header, while the remaining cycles contain the data, which are in normal order. Currently, Bits[5..0] of the address field are ignored, and are set to zero. An IOPutBlockRply packet acknowledges that the write requested by an earlier IOPutBlockRqst is complete. The packet is two cycles long. The first cycle contains the header, while the second cycle is unused. With the exception of the request/reply difference in the header cycle, all other fields are identical, and the destination field 95 is identical to the request packet's source field 94.

The Demap command is used to remove the virtual to physical mapping for one or more virtual pages. When a processor wants to demap a page, its CC issues a DemapRqest on the bus with the destination field 95 set to zero. BW0 picks up the packet and sends it onto the system bus. As each BW (except the initiating BW0) receives the request, it forwards a DemapRqst packet through its bus to the CC. The CC uses a DemapRply to notify its BW0 that the Demap is complete locally. The initiating BW0 uses the DemapReply to notify its CC that the Demap is complete in all other caches.

In the present embodiment, DemapRqst consists of two cycles: the address field 98 in the header cycle must be all zeros, while the entity to be demapped is specified in the second cycle. While the format of the second cycle is not relevant to the bus, it is shown in FIG. 11 to better describe the invention. Currently, VPN represents the Virtual Page Number where the removal of virtual to physical mapping is to occur; Type indicates the object, e.g. page, segment, region, etc., to be demapped; RSV represents the reserved field and is currently supplied as zero. For further information regarding the Demap command, please refer to SPARC Reference MMU, Version 8, 11 Dec. 1990, available from Sun Microsystems, Inc., Mountain View, Calif.

The DemapRply packet acknowledges an earlier DemapRqst packet; it is two cycles long. The first cycle contains the header with the address field 98 set to all zeros. The second cycle is unused, and its contents are "don't care".

Figure 15:
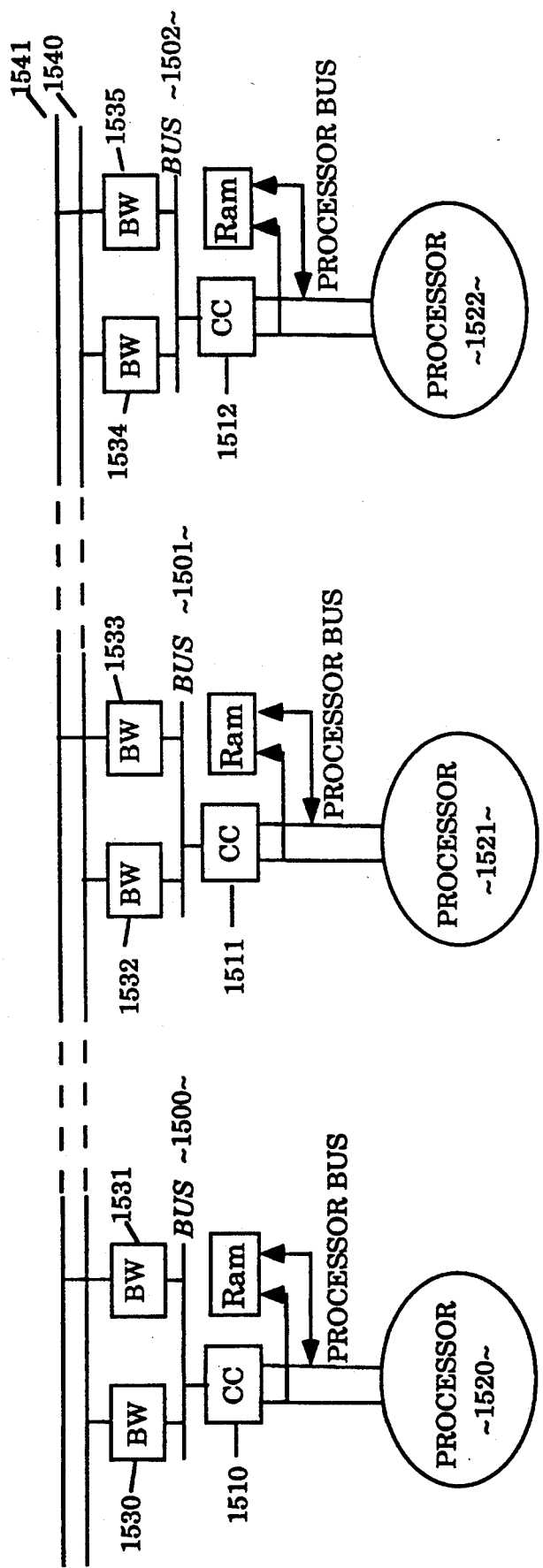
FIG. 15 is a schematic representation of the operation of an interrupt command among multiple processors employing the bus of the presently claimed invention.

Referring now to FIG. 15, the interrupt command is used to generate processor interrupts. Because the interrupt lines are carried on the bus, it is different from prior art buses, where the interrupt lines are separate from the bus. Each interrupt has an initiating bus 1500, and one or more target buses 1501 and 1502. The initiating bus 1500 contains the device that generated the interrupt, while the target buses are the ones whose processors 1521 and 1522 are to be interrupted. The interrupt command is used both at the initiating end and the target ends.

When a processor 1520 initiates an interrupt, its CC 1510 sends an InterruptRqst packet to one of its BWs 1530, which forwards this packet on to the system bus 1540. When the BW 1530 receives its own packet from the system bus 1540, the BW 1530 responds with an InterruptRply packet to notify its CC 1510. If the BW 1530 itself is not one of the targets of the interrupt, this reply packet serves only as an acknowledgement. Otherwise, it serves both as an acknowledgement and as a request to interrupt the local processor 1520.

When a processor 1522 is the target of an interrupt initiated by some other bus, the interrupt request arrives over the system bus 1540 and is forwarded by the BW 1534 as an InterruptRqst packet on the target bus 1502. Once the CC 1512 has interrupted the processor 1522, it acknowledges the InterruptRqst packet with an InterruptRply.

In the present embodiment, both InterruptRqst and InterruptRply packets consist of two cycles. In each case the first cycle contains the header with the address field set to zero, and the second cycle contains the interrupt data formatted as shown in FIG. 12.

Referring to FIG. 12, the TargetID and IntlD are interpreted by the BW's when an interrupt packet is received over the system bus. While the format is not relevant to the bus, it is recited below to better describe the invention. In the present embodiment, B is the broadcast bit, which specifies whether all processors are to be interrupted or just the processor designated by the TargetID. The TargetID is ignored when the broadcast bit is asserted. Finally, the IntSID specifies the source for the interrupt. The SetBits field is interpreted on the bus. It specifies the bits that must be set in the CC's interrupt status register when it receives an interrupt request or reply.

TAG COMMANDS

As will be described below, the Tag Command 97 (TCmd) within a packet header as shown in FIG. 9 specifies how the tag for the entry specified by the address portion 98 of the header should be manipulated. In general, the BW's and CC use TCmd 97 to keep their copies of tags in synchrony. A tag contains four flags: Shared, Owner, Valid, and Pending, and some address comparison, or AComp bits. In the I/O bus interface embodiment, cache tags are kept entirely within the I/O caches (IOC). Thus, this embodiment does not use the TCmd field for the purpose of keeping tags consistent.

The four flags have the following meanings: the Shared bit indicates whether the entry is present in more than one cache on the system bus. The Owner bit indicates whether this copy should respond to reads over the system bus. The Valid field indicates whether the entry is valid or not; multiple bits are used because some consistency algorithms need multiple valid states. The current embodiment uses a single valid bit. The Pending state is useful only for packet-switched buses: it indicates whether the entry has a packet outstanding on the system bus. The AComp field contains those bits of the address that are not used as an index into the Tag array.

Referring to FIG. 13, TCmd consists of three parts: a ShCmd that indicates how the Shared bit should be manipulated, a OwCmd that indicates how the Owner bit should be manipulated, and a VCmd that indicate how the Valid and Tag bits should be manipulated.

The ShCmd and OwCmd fields can be encoded as follows:

| Encoding | Meaning |
| --- | --- |
| 00 | Write the value 0 |
| 01 | Write the value 1 |
| 10 | Expect the value 0 |
| 11 | Expect the value 1 |

The two Expect codes are provided to the destination device for information purposes. Currently, the implementation does not require checking that the local copy of the tag bits have the expected value, but this may be done for better error detection.

The VCmd field is encoded as follows:

| Encoding | Meaning |
| --- | --- |
| 00 | Decrement |
| 01 | Clear Valid |
| 10 | Set Valid and Write Tag |
| 11 | Noop |

Decrement is used by the BW to signal the CC that the valid bits for a line in the cache should be decremented as a result of an external write from another processor. When the valid bits for that line are reset, the line disappears from the cache for that local processor. This is an implementation called "competitive cacheing," where a processor avoids the expense of going to the lines of other processors' caches for a write by trying to eliminate those lines by decrementing their valid bits. On the other hand, the local processor retains its line in the cache by incrementing the valid bits so that a cache miss can be avoided and the processor does not have to go to the main memory during a cache miss.

Set Valid and Write Tag is used by the BW to signal the CC that the information is new and the processor-side tags should be updated to maintain consistency between the tags. Clear Valid is used to remove a block from the cache without using the competitive cacheing implementation.

ERROR DETECTION AND REPORTING

The bus provides a single mechanism for detecting bus errors. In the present embodiment, four parity bits check the 64 bits of data as follows: XParity[3] check XData[63..48], XParity[2] check XData[47..32], XParity[1] checks XData[31..16], and XParity[0] checks XData[15..0]. However, it will be apparent to those skilled in the art that other parity-checking schemes may also be employed. The XParity wires are also used to encode whether the cycle is a Header, Data, Memfault, or Idle.

There are two mechanisms for reporting errors over the bus, and both apply to reply packets. Referring FIG. 14, the first is to set the Err bit 1401 in a reply packet, and the second is to convert a Data cycle 1400 for the packet into a Memfault cycle. The first mechanism is used when the error is detected early enough so it can be reported in the header cycle. The length of an error reply packet must be the same as the length of the corresponding normal reply packet. The second mechanism is used when the error is detected only after the packet header has been sent.

FIG. 14 shows the format of the header cycle and the first data cycle 1400 when an error is reported in the header cycle.

The format of a Memfault cycle is identical to that of the first data cycle 1400 shown in FIG. 14. ErrorCode itself is divided into a MajorCode that divides the error into one of 16 broad categories, and a MinorCode that provides more detailed information about the error.

Although the present invention has been described with reference to FIGS. 1-16, it will be appreciated that the teachings of the present invention may be applied to a variety of inter-chip and/or interprocess bus structures.

What is claimed:

1. A packet-switched bus for transferring data between a plurality of system buses and a cache controller of a cache for storing data, said cache controller being coupled to a processor, comprising:

data lines coupled to said system buses and said cache controller for transmitting data and command information between said system buses and said cache controller;

control lines coupled to said system buses and said cache controller for transmitting a plurality of clock signals, said clock signals being coupled to said system buses and said cache controller;

sending and receiving means for transferring data and command information between one of said system buses and said data and control lines, said sending and receiving means being coupled to said system buses and said data and control lines, said sending and receiving means including:

at least one input FIFO buffer coupled to each of said system buses for buffering data and command information to be transferred to said data and control lines;

at least one output FIFO buffer coupled to each of said system buses for transferring data and command information from said data and control lines to its system bus; and storage means for storing and monitoring a disjointed set of cache tags for said cache for each of said system buses;

priority arbitration means coupled to said sending and receiving means and said cache controller for receiving and granting requests for control of said data and control lines, each sending and receiving means for each system bus transmitting a bus request for control of said data and control lines to said priority arbitration means a predetermined delay after receiving said data and command information from its system bus such that the bus requests are received by said priority arbitration means in the same order as each input FIFO buffer receives its data and command information from its system bus, said priority arbitration means receiving and granting each request through point-to-point request and grant lines coupling to each sending and receiving means of each system bus, each of said grant lines being continuously asserted while the data and command information is transferred onto said data and control lines; and overflow control means coupled to said priority arbitration means, to said cache controller and to said sending and receiving means for preventing overflow, said overflow control means controlling the flow to said priority arbitration means by causing said system buses not to transfer data and command information to each of said sending and receiving means such that no bus request is sent from each sending and receiving means, said overflow control means controlling the flow into said cache controller by causing said priority arbitration means not to grant bus requests to said sending and receiving means, said overflow control means controlling the flow to said sending and receiving means from said data and control lines by causing said cache controller not to transfer to said sending and receiving means, whereby data is transferred between said cache controller and said system buses.

2. The bus as defined by claim 1, further comprising means for automatically granting control of said data and control lines to said cache controller when said data and control lines is idle but before a cache miss, such that as soon as control of said data and control lines is requested by said cache controller during said cache miss, data and commands will be transferred from said controller to said data and control lines; said priority arbitration means then granting control of said data and control lines to said sending and receiving means after the data and commands have been transferred to said system buses but before a response from said system buses arrives at said sending and receiving means such that said response can be transferred from said sending and receiving means to said cache controller through said data and control lines as soon as control of said data and control lines is requested by said sending and receiving means when said response arrives from one said system buses.

3. The bus as defined by claim 1, wherein said plurality of system buses are coupled to a plurality of other processors and cache controllers through their corresponding sending and receiving means, and said data and control lines further comprises interrupt means for generating and acknowledging processor interrupts, said interrupt means transferring a processor interrupt and acknowledgment between a first cache controller and a second cache controller through their respective sending and receiving means coupled through said system buses, said second cache controller generating an acknowledgment to reply said interrupt and interrupting its processor if it is the processor intended by said interrupt.

4. The bus as defined by claim 3, wherein said interrupts means comprises:

means for identifying a target to be interrupted by transmitting a command specifying said target through its sending and receiving means to its system bus;

means for identifying a source for the target to transmit its reply through its system bus after said target determines that it is the target to be interrupted.

5. The bus as defined by claim 1, wherein said priority arbitration means is disposed in said cache controller for receiving bus requests and granting bus grants directly from said cache controller such that bus requests and grants for said cache controller are not transferred through said data and control lines.

6. In a computer system including a plurality of system buses coupled to a plurality of cache controllers, each of said cache controllers coupled to a cache RAM and to a processor, a packet-switched bus for transferring data between said system buses and each of said cache controllers, comprising:

data lines coupled to each of said system buses and said cache controllers for transmitting data and command information between said system buses and each of said cache controllers;

control lines coupled to said system buses and each of said cache controllers for transmitting a plurality of clock signals, said clock signals being coupled to said system buses and each of said cache controllers;

sending and receiving means for transferring data and command information between one of said system buses and said data and control lines, said sending and receiving means being coupled to one of said system buses and said data and control lines, said sending and receiving means including:

at least one input FIFO buffer coupled to each of said system buses for buffering data and command information to be transferred to said data and control lines;

at least one output FIFO buffer coupled to each of said system buses for transferring data and command information from said data and control lines; and storage means for storing and monitoring a disjointed set of cache tags for said cache for each of said system buses;

priority arbitration means coupled to said sending and receiving means and each of said cache controllers for receiving and granting requests for control of said data and control lines, said sending and receiving mean for each system bus transmitting a bus request for control of said data and control lines to said priority arbitration means a predetermined delay after receiving said data and command information from its system bus such that the bus requests are received by said priority arbitration means in the same order as each sending and receiving means of each system bus receives its data and command information from its system bus, said priority arbitration means receiving and granting each request through point-to-point request and grant lines coupling to each sending and receiving means of each system bus, each of said grant lines being continuously asserted while the data and command information are transferred on said data and control lines; and overflow control means coupled to said priority arbitration means, to said cache controller and to said sending and receiving means for preventing overflow, said overflow control means controlling the flow to said priority arbitration means by causing each of said system buses not to transfer data and command information to its sending and receiving means, said overflow control means controlling the flow into each of said cache controllers by causing said priority arbitration means not to grant bus requests to said sending and receiving means, said overflow control means controlling the flow to said sending and receiving means from said data and control lines by causing each of said cache controllers not to transfer to said sending and receiving means, whereby data is transferred between said cache controllers and said system buses.

7. The bus as defined by claim 6, wherein said priority arbitration means coupled to each of said data and control lines includes means for automatically granting control of said data and control lines to its cache controller when said data and control lines is idle but before a cache miss, such that as soon as control of said data and control lines is requested by said cache controller during said cache miss, data and commands will be transferred from said controller to said data and control lines; said priority arbitration means then granting control of said data and control lines to said sending and receiving means after the data and commands have been transferred to said system buses but before a response from said system buses arrives at said sending and receiving means such that said response can be transferred from said sending and receiving means to said cache controller through said data and control lines as soon as control of said data and control lines is requested by said sending and receiving means when said response arrives from said system buses.

8. The bus as defined in claim 6, further including interrupt means for generating and acknowledging processor interrupts, said interrupt means comprises:
means for identifying a target to be interrupted by transmitting a command specifying said target through its sending and receiving means to its system bus;
means for identifying a source for the target to return its reply through its system bus after said target determines that it is the target to be interrupted.

9. The bus as defined by claim 6, wherein said priority arbitration means is disposed in each of said cache controller.

10. A method for transferring data on a packet-switched bus coupled between a plurality of system buses and a cache controller of a processor, comprising the steps of:
providing data and command information from either said system buses or said cache controller to be transferred over said packet switched bus;
arbitrating for control of said packet switched bus using priority arbitration means based on a predetermined priority heirarchy, including the steps of:
transmitting a request signal for control of said packet switched bus on data lines coupled to said system buses and said cache controller; and
receiving a grant signal for control of said packet switched bus on said data lines coupled to said system buses and said cache controller;
transferring said data and command information on said data lines coupled to said system buses and said cache controller to either of said system buses by sending and receiving means coupled to said system buses and said cache controller;
controlling data flow over said packet switched bus through overflow control means to prevent said arbitration means and said sending and receiving means from exceeding the data transfer capability of said packet switched bus with data and command information, including:
deasserting said grant signal for control of said packet switched bus by said sending and receiving means when said sending and receiving means contains requests for control of said packet switched bus beyond a first predetermined level;
halting flow of data from said system buses into said sending and receiving means and flow of request signals from said sending and receiving means to said cache controller when said arbitration means contains request signals for control of said packet switched bus beyond a second predetermined level;
halting flow of reply signals from said cache controller to said sending and receiving means when said arbitration means contains request signals for control of said packet switched bus beyond a third predetermined level; and
halting flow of data from said cache controller to said sending and receiving means when said sending and receiving means contains data to be sent on said system buses beyond a fourth predetermined level;

whereby data is transferred between said system buses and said cache controller.

11. A method according to claim 10, further comprising the steps of minimizing arbitration latency for transferring data on a first bus coupled to a plurality of system buses and a cache controller, said latency occurring when control of said first bus is requested for a cache miss while said first bus is idle, said steps comprising:
granting control of said first bus to said cache controller when said first bus is idle;
generating a request for control of said first bus by said cache controller upon a cache miss by a processor coupled to said cache controller;
transferring a request for data and command to one of said system buses through the receiving and sending means coupled to each of said system buses, said receiving and sending means being coupled to said first bus and to said cache controller;
granting control of said first bus to said receiving and sending means of said system bus;
whereby upon arrival of a reply for said request at said receiving and sending means, said reply is transferred to said cache controller without arbitration delay.

12. In a computer system including a plurality of system buses coupled to a plurality of cache controllers, each of said cache controllers coupled to a cache RAM and to a processor, a method for minimizing arbitration latency for transferring data on a first bus coupled to said plurality of system buses and said cache controller, said latency occurring when control of said first bus is requested for a cache miss while said first bus is idle, comprising the steps of:
granting control of said first bus to said cache controller when said first bus is idle;
generating a request for control of said first bus upon a cache miss by a processor coupled to said cache controller;
transferring a request for data and command to one of said system buses through its receiving and sending means coupled to each of said system buses, said receiving and sending means being coupled to said first bus;
granting control of said first bus to said receiving and sending means of said system bus;
whereby upon arrival of a reply for said request at said receiving and sending means, said reply is transferred to said cache controller without arbitration delay.

13. The method as defined by claim 10, further comprising a method of interrupting a target processor by a source processor coupled through said system buses, wherein said method comprises:
- transferring an interrupt command from the cache controller of said source processor to said packet switched bus, said interrupt command specifying said target processor to be interrupted and said source processor;
- transferring said interrupt command to said system buses from said packet switched bus through its sending and receiving means;
- receiving said interrupt command by the sending and receiving means of all other processors coupled to said system buses;
- replying said interrupt command by transmitting an acknowledgement to the sending and receiving means of said source processor through said system buses by said all other processors, each of said other processors determining whether it is the intended target processor by reading said interrupt command;
- interrupting said target processor as specified by said interrupt command.

14. In a computer system including a plurality of system buses coupled to a plurality of cache controllers, each of said cache controllers coupled to a cache and to a processor, a method for transferring data on a packet-switched bus coupled between said system buses and each of said cache controllers, comprising the steps of:
- providing data and command information to be transferred between said system buses and said cache controller through said packet switched bus;
- arbitrating for control of said packet switched bus using priority arbitration means based on a predetermined priority hierarchy, including the steps of:
  - transmitting a request signal for control of said packet switched bus on data lines coupled to said system buses and said cache controller; and
  - receiving a grant signal for control of said packet switched bus on said data lines coupled to said system buses and said cache controller;
- transferring said data and command information on said data lines coupled to said system buses and said cache controller;
- controlling data flow over said packet switched bus through overflow control means to prevent said arbitration means and said sending and receiving means from exceeding the data transfer capability of said packet switched bus with data and command information, including:
  - deasserting said grant signal for control of said packet switched bus by said sending and receiving means when said sending and receiving means contains requests for control of said packet switched bus beyond a first predetermined level;
  - halting flow of data from said system buses into said sending and receiving means and flow of request signals from said sending and receiving means to said cache controller when said arbitration means contains request signals for control of said packet switched bus beyond a second predetermined level;
  - halting flow of reply signals from said cache controller to said sending and receiving means when said arbitration means contains request signals for control of said packet switched bus beyond a third predetermined level; and
  - halting flow of data from said cache controller to said sending and receiving means when said sending and receiving means contains data to be sent on said system buses beyond a fourth predetermined level;

whereby data is transferred between said system buses and said cache controller.

15. The method as defined by claim 14, further comprising the steps of interrupting a target processor by a source processor coupled through said system buses in said computer system, said steps comprising:
- transferring an interrupt command from the cache controller of said source processor to its packet switched bus, said interrupt command specifying said target processor to be interrupted and said source processor;
- transferring said interrupt command to said system buses from said packet switched bus through its sending and receiving means;
- receiving said interrupt command by the sending and receiving means of all other processors coupled to said system buses;
- replying said interrupt command by transmitting an acknowledgement to the sending and receiving means of said source processor through said system buses by said all other processors, each of said other processors determining whether it is the target processor by reading said interrupt command;
- interrupting said target processor as specified by said interrupt command.

* * * * *

UNITED STATES PATENT AND TRADEMARK OFFICE
CERTIFICATE OF CORRECTION

PATENT NO. : 5,195,089
DATED : 3/16/93
INVENTOR(S) : Sindhu et al.

It is certified that error appears in the above-indentified patent and that said Letters Patent is hereby corrected as shown below:

On the Title Page:

[73] delete "ASSIGNEE: "SUN MICROSYSTEMS, INC., MOUNTAIN VIEW, CALIF." and insert --ASSIGNEE: SUN MICROSYSTEMS, INC., MOUNTAIN VIEW, CALIF. AND XEROX CORPORATION, STAMFORD, CONN. --

Signed and Sealed this

Twenty-third Day of August, 1994

Attest:

BRUCE LEHMAN

Attesting Officer

Commissioner of Patents and Trademarks